(12) United States Patent
Marchese

(10) Patent No.: US 8,856,019 B2
(45) Date of Patent: Oct. 7, 2014

(54) SYSTEM AND METHOD OF STORING DATA RELATED TO SOCIAL PUBLISHERS AND ASSOCIATING THE DATA WITH ELECTRONIC BRAND DATA

(75) Inventor: Joseph John Marchese, Camarillo, CA (US)

(73) Assignee: True[X] Media Inc., Los Angeles, CA (US)

( * ) Notice: Subject to any disclaimer, the term of this patent is extended or adjusted under 35 U.S.C. 154(b) by 1482 days.

(21) Appl. No.: 11/752,185

(22) Filed: May 22, 2007

(65) Prior Publication Data

US 2008/0033776 A1    Feb. 7, 2008

Related U.S. Application Data

(60) Provisional application No. 60/808,017, filed on May 24, 2006, provisional application No. 60/817,668, filed on Jun. 30, 2006.

(51) Int. Cl.
| | |
|---|---|
| G06Q 10/00 | (2012.01) |
| G06Q 30/02 | (2012.01) |
| G06Q 20/10 | (2012.01) |
| G06Q 30/00 | (2012.01) |
| G06Q 40/04 | (2012.01) |

(52) U.S. Cl.
CPC ............ *G06Q 30/00* (2013.01); *G06Q 30/0215* (2013.01); *G06Q 20/10* (2013.01); *G06Q 30/0204* (2013.01); *G06Q 40/04* (2013.01)
USPC ........................................ 705/7.29; 705/7.31

(58) Field of Classification Search
USPC ........................ 705/7.29, 7.31, 7.11
See application file for complete search history.

(56) References Cited

U.S. PATENT DOCUMENTS

| | | | |
|---|---|---|---|
| 6,029,141 | A | 2/2000 | Bezos et al. |
| 6,269,361 | B1 | 7/2001 | Davis et al. |

(Continued)

FOREIGN PATENT DOCUMENTS

EP        1172744        1/2002

OTHER PUBLICATIONS

Matthew, Richardson, and Domingos Pedro. "Mining knowledge-sharing sites for viral marketing." Proceedings of the eighth ACM SIGKDD international conference on Knowledge discovery and data mining. New York: ACM, 2002. 61-70. Print.*

(Continued)

*Primary Examiner* — William Brockington, III
(74) *Attorney, Agent, or Firm* — Fenwick & West LLP

(57) ABSTRACT

A system and method of storing data related to social publishers and associating the data with electronic brand data is disclosed. The system includes an online persona definition module configured to receive information about a social publisher and, based on the received information, associate personality traits with the social publisher. A social influence measurement module receives social network metrics and social network activities related to social publishers and determine a level of social influence for the social publishers. A brand promoter management module is configured to receive data from the brand promoter, the including targeting elements for an advertising campaign, including a specified a level of social influence and a set of personality traits. The brand promoter may also upload brand art to display within the social network. An association is configured to determine if social publishers meet the targeting elements. An offer selection module allows selected social publishers to accept sponsorship offers and display the brand art within their social content.

24 Claims, 23 Drawing Sheets

(56) References Cited

U.S. PATENT DOCUMENTS

| | | |
|---|---|---|
| 6,691,155 B2 | 2/2004 | Gottfried |
| 6,954,728 B1* | 10/2005 | Kusumoto et al. ........... 705/14.4 |
| 2003/0149618 A1 | 8/2003 | Sender et al. |
| 2003/0187767 A1 | 10/2003 | Crites et al. |
| 2004/0215542 A1 | 10/2004 | Rossides |
| 2004/0225715 A1 | 11/2004 | Gottfried |
| 2004/0267611 A1 | 12/2004 | Hoerenz |
| 2005/0149397 A1* | 7/2005 | Morgenstern et al. .......... 705/14 |
| 2005/0203801 A1 | 9/2005 | Morgenstern et al. |
| 2005/0234781 A1 | 10/2005 | Morgenstern et al. |
| 2005/0278218 A1 | 12/2005 | Adams et al. |
| 2005/0288954 A1 | 12/2005 | McCarthy et al. |
| 2006/0009994 A1 | 1/2006 | Hogg et al. |
| 2006/0010029 A1* | 1/2006 | Gross ............................ 705/10 |
| 2006/0036641 A1* | 2/2006 | Brydon et al. ................ 707/102 |
| 2006/0042483 A1 | 3/2006 | Work et al. |
| 2006/0074751 A1* | 4/2006 | Kline et al. ..................... 705/14 |
| 2006/0085259 A1 | 4/2006 | Nicholas et al. |
| 2006/0089880 A1* | 4/2006 | Merriman et al. .............. 705/14 |
| 2006/0167752 A1 | 7/2006 | Pozesky et al. |
| 2007/0121843 A1* | 5/2007 | Atazky et al. ............ 379/114.13 |
| 2007/0150353 A1* | 6/2007 | Krassner et al. ................ 705/14 |
| 2007/0208611 A1 | 9/2007 | Collison et al. |
| 2007/0239541 A1 | 10/2007 | Kane et al. |
| 2007/0282675 A1 | 12/2007 | Varghese |

OTHER PUBLICATIONS

International Search Report and Written Opinion for PCT/US2007/12338 dated Jan. 28, 2008.

* cited by examiner

SocialCurrency
Brand Accounts

| 1114 View Campaigns | 1116 Submit Campaign | 1118 Manage Campaigns |

By: Influence Level    Geography — 1129

| | Backgrounds | Banners | Product Placement |
|---|---|---|---|
| Level 1 | Bid: CPM - $10<br>Today's Views: 300,000<br>Today's Spend $3,000 | Bid: CPM - $3<br>Today's Views: 300,000<br>Today's Spend $900 | Bid: CMP - $20<br>Today's Views: 30,000<br>Today's Spend $600 |
| Level 2 | Bid: CPM - $8<br>Today's Views: 500,000<br>Today's Spend $4,000 | Bid: CPM - $2<br>Today's Views: 300,000<br>Today's Spend $500 | N/A |
| Level 3 | Bid: CPM - $4<br>Today's Views: 900,000<br>Today's Spend $3,600 | Bid: CPM - N/A<br>Today's Views: xxx<br>Today's Spend xxx | N/A |
| Main Pages | Bid: CPM - $7<br>Today's Views: 2.5M<br>Today's Spend $17,500 | Bid: CPM - N/A<br>Today's Views: xxx<br>Today's Spend xxx | N/A |

1128 —
- Cola College
- Cola Sports
- Cola Women
- Diet Cola
- Cola Splendid 1120, 1122, 1124, 1126

FIG. 11B

SocialCurrency
*Tell Us About you...*

Here's the thing, we want to change the way advertisers look at social celebrities like yourself. So this means we have to be very picky about who we let in. And if we let you in and we have to ask you to leave, we can't ever let you back in, sorry. But here's the good news; just be honest and keep things appropriate (we'll tell you more about this later). Tell us the truth about who you are and we will do our best to make your online life a little cooler and pay you for it in the real world

The Hard Part

What's your name? [First] [Last]

Where do you get your mail [City] [Street]
(checks, gifts...)

What's your birthday? [xx/xx/xxxx]
(please don't lie here it's the best
way to be asked to leave)

We need a License# or SSN#? [xxxxxx]
(they will not allow us to pay you in unmarked bills)

What Social Networks do you
frequent?

- InSocial ☑ (largest payout per View)
- MyYearBook ☐   360 ☐   Orkut ☐   FaceBook ☐
- MySpace ☐

The Fun Part

Ok lets get to know you: — 1204

Rank these based on the statement
I'd rather drive a:

Truck ☐     Luxury Car ☐
Sports Car ☐
SUV ☐
Dirt Bike ☐
Motorcycle ☐

[Submit] — 1208

*FIG. 12A*

SocialCurrency

*Tell Us About you...*

Here's the thing, we want to change the way advertisers look at social celebrities like yourself. So this means we have to be very picky about who we let in. And if we let you in and we have to ask you to leave, we can't ever let you back in, sorry. But here's the good news; just be honest and keep things appropriate (we'll tell you more about this later). Tell us the truth about who you are and we will do our best to make your online life a little cooler and pay you for it in the real world

The Hard Part

What's your name? [First]  [Last]

Where do you get your mail [City]  [Street]
(checks, gifts...)

What's your birthday? [xx/xx/xxxx]  ← 1202

We need a License# or SSN#? [xxxxxx]
(please don't lie here it's the best
way to be asked to leave)

What Social Networks do you
frequent?

1206 —

InSocial ☑ (largest payout per View)    MySpace ☐

MyYearBook ☐   360 ☐   Orkut ☐   FaceBook ☐

The Fun Part

Ok lets get to know you:  ← 1204

Distribute 100 points based on your average week
I'd say a normal week consists of:

Work ☐           Leisure ☐

Sleep ☐

Partying ☐       Points
                 Remaining [100]
Exercise ☐

Significant Other ☐

1208
[Submit]

*FIG. 12B*

SocialCurrency
Tell Us About you...

Here's the thing, we want to change the way advertisers look at social celebrities like yourself. So this means we have to be very picky about who we let in. And if we let you in and we have to ask you to leave, we can't ever let you back in, sorry. But here's the good news; just be honest and keep things appropriate (we'll tell you more about this later). Tell us the truth about who you are and we will do our best to make your online life a little cooler and pay you for it in the real world

The Hard Part

What's your name? [First] [Last]

Where do you get your mail (checks, gifts...) [City] [Street]

What's your birthday? [xx/xx/xxxx]
(please don't lie here it's the best way to be asked to leave)

We need a License# or SSN#? [xxxxxx]
(they will not allow us to pay you in unmarked bills)

What Social Networks do you frequent?

InSocial ☑ (largest payout per View)   MySpace ☐

MyYearBook ☐   360 ☐   Orkut ☐   FaceBook ☐

The Fun Part

Ok lets get to know you:

Rank these based on the statement I'd rather:

Drink with Friends ☐   Play a pick B-Ball game ☐

Game ☐

Read a book ☐

Lay on the beach ☐

See the family ☐

[Submit]

*FIG. 12C*

SocialCurrency

Hey Matt! What's going on?

You are currently sponsored by: ← 1222

| Background | Abercrombie |
|---|---|
| Banner | Only Available for InSocial Network |
| Placement | |

*Check for new offers/change offer*

SocialCurrency Bulletin Board

Check Back here for SocialCurrency news and special offers. Did you know that many sponsorship opportunities are only available for the InSocial Network

| My Earnings | Sponsorship Offers | Edit Profile & Settings | Contact Us |
|---|---|---|---|

← 1220

↙ 1224

| | | Date | Background | Banners | Placement |
|---|---|---|---|---|---|
| Year | Month | 3-1 | $$$ | | |
| | | 2-28 | $$$ | Only Available for InSocial Network | |
| | | 2-27 | $ | | |
| | 5-Day | 2-26 | $$$ | | |
| | | 2-25 | $$ | | |

Got a Popular Friend?

Invite a friend to SocialCurrency and we will pay you based on their popularity!

SocialCurrency

Hey Matt! What's going on?

Automatically select the highest paying offer: [On] [Off]

SocialCurrency Bulletin Board
Check Back here for SocialCurrency news and special offers. Did you know that many sponsorship opportunities are only available for the InSocial Network

| My Earnings | Sponsorship Offers | Edit Profile & Settings | Contact Us |

— 1232

— 1234

— 1230

| Top Offers | New Offers | Most Pop. |
|---|---|---|
| Abercrombie | | Sports |
| | Not yet unlocked | Not yet unlocked |
| Only Available for InSocial Network | Only Available for InSocial Network | Only Available for InSocial Network |

You are currently sponsored by: Cola

| Background | Abercrombie |
|---|---|
| Banner | Only Available for InSocial Network |
| Placement | |

Do the sponsorship offers fit for you? If not Contact Us

*FIG. 12E*

SocialCurrency

Hey Matt! What's going on?

SocialCurrency Bulletin Board
Check Back here for SocialCurrency news and special offers. People who violate SocialCurrency's TOS hurt everyone. If you report one to us, we'll put in a good word with the sponsors for you.

| My Earnings | Sponsorship Offers | Edit Profile & Settings | Contact Us |

Are your sponsorship way off? *Click Here* ← 1240

1242 →

*Report a violator?*
Report SocialCurrency member breaking our TOS and we will put in a good word with the sponsors for you

← 1244

*Tell us what you think?*
Got an idea to make SocialCurrency better

*Got a Popular Friend?*
Invite a friend to SocialCurrency and we will pay you based on their popularity!

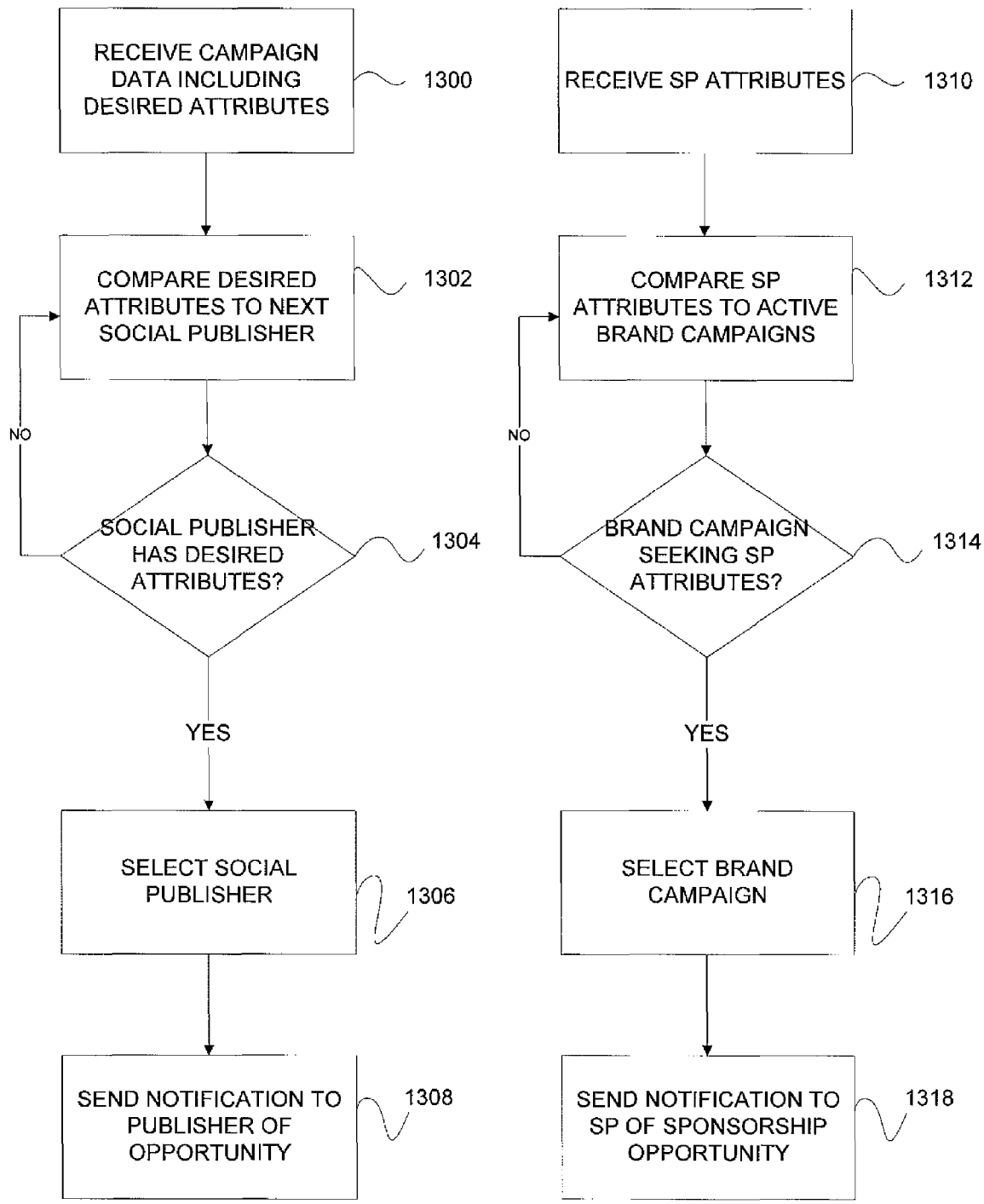
*FIG. 13A*     *FIG. 13B*

SYSTEM AND METHOD OF STORING DATA RELATED TO SOCIAL PUBLISHERS AND ASSOCIATING THE DATA WITH ELECTRONIC BRAND DATA

CROSS-REFERENCE TO RELATED APPLICATIONS

This application claims the benefit of U.S. Provisional Patent Application No. 60/808,017, filed on May 24, 2006. This application also claims the benefit of U.S. Provisional Patent Application No. 60/817,668, filed on Jun. 30, 2006. Each of the above-referenced applications is incorporated by reference herein in its entirety.

BACKGROUND OF THE INVENTION

1. Field of the Invention

This application relates to methods of gathering, storing, organizing and serving data related to online advertising in computerized social network application environments. More particularly, this application relates to a system and method of storing brand data in a database, associating the brand data with social publisher data and serving brand advertising data to social content in an online social network environment.

2. Description of the Related Technology

Traditionally, brand promoters have reached the target audience for their brands by advertising in various communication media such as print media, television, or radio. Over time, brand promoters learned that certain types of people tended to watch certain types of television shows. As a result, brand promoters began to purchase commercial time from television shows whose audience tended to fit the target demographic for the brand or product being promoted.

In recent years, the emergence of the Internet as an important communications medium has produced new opportunities for brand promoters to deliver an advertising message to consumers. Initially, advertising on the Internet was very inefficient, as brand advertisements were often displayed haphazardly in websites, without any consideration of the relevance of the ad to the other content in the website. In addition, many advertisements were served as "popup" windows, which quickly became viewed as a nuisance by many web users. Thus, brands that were presented in these forms often did not provide a positive impression to the consumer viewing the brand advertisement.

Eventually, owners and operators of websites that served advertisements devised more effective technology solutions which allowed brand promoters advertising on their sites to reach their target audiences. One of the solutions that has become popular is the use of contextual based advertising. Contextual ad-serving technology provides brand promoters and other advertisers a way to place contextually relevant ads across networks of hundreds of thousands of publishers, without having to evaluate and approve each advertisement. Contextual ad-serving systems assess a number of variables, including the text on the web page, to determine which ads to serve on the page. The most relevant advertisement for the content of the page is served, which presumably may be of the most interest to the person viewing that web page.

FIG. 1A provides an illustration of how a contextual-based web advertising system may operate. At block 100, a website operator may receive advertisements from advertisers for displaying on the website. These advertisements may be stored in a database. When a web user requests a page from the website, the text on that page is analyzed at block 102 to determine the type of information included in the requested web page. At block 104, the system determines the most relevant advertisements based on the content of the web page. Finally, at bock 106, the system serves the requested web page, and includes the most relevant advertisements along with the page content.

More recently, behavioral ad serving systems have been developed which take into account not only the content of the web page, but also the viewer of the web page. Using behavioral ad-serving technology, the emphasis is placed not only on the content but an analysis of the viewer of the content. These types of systems typically evaluate the viewer's past online actions and pages viewed, often through the use of cookies or some other tracking technology.

FIG. 1B provides an illustration of how a behavioral ad-serving web application may operate. At block 110, the website operator/content provider receives advertisements from advertisers and stores the advertisements in a database. At block 112, a user requests a page on the website. Next, at block 114, the website obtains the past online actions of the user, possibly by reading a cookie stored in the user's browser. Finally, at block 116, the website analyzes the past online actions of the user, and delivers an advertisement that is most relevant to those actions.

Behavioral advertising such as that described in FIG. 1B has limitations. For example, consider a viewer who had recently viewed web pages about motorcycles. In a system utilizing behavioral advertising, an ad relating to trucks would be served to the user if he requested a page in the system. However, the requested page might have nothing to do with trucks. For example, the user could be online looking for ballet lessons for his daughter. If the page found (listing ballet lessons) is a member of a behavioral advertising network, a truck ad would be served along with the page, and would seem grossly out of place and contexts. In the past few years, a new kind of website has gained prominence within the Internet realm—the social networking website. Well-known examples of social networking websites are MySpace.com, Facebook.com, Classmates.com, LiveJournal, and Friendster.com. To date, brand promoters have not been successful in leveraging current ad-serving technologies to associate their brands with social content produced and maintained on social networking websites. One reason that brands have not been able to leverage current ad-serving systems for association with social content and other user generated content is that major brands have significant value at risk when associating their brand with content of any sort. Millions of dollars are spent carefully crafting brand messages in order to build intangible corporate assets. For this reason, brands are particularly careful about the content with which consumers will associate their brands.

SUMMARY OF CERTAIN INVENTIVE ASPECTS

The system, method, and devices of the present invention each have several aspects, no single one of which is solely responsible for its desirable attributes. Without limiting the scope of this invention, several of its features will now be discussed briefly.

The computer implemented method allowing brand promoters to target the personality and preferences of publishers of social content rather than the content present on a social publishers' page or the some measure of the attributes of those viewing the social publishers' page. A method including databases of information pertaining to brand promoter and social publisher preferences and matching system configured to allow brand promoters to place and social publishers to receive personality and preference relevant brand integration across the highly distributed medium of social content garnering a rapidly increase share of consumer attention;

One aspect provides a computer-implemented method brand promoters to associate a brand with a plurality of social publishers who produce social content. The method includes receiving, from the brand promoter, desired social characteristics of social publishers to be associated with the brand. The desired social characteristics may include a level of social influence of the social publishers which may be defined based in part on measured activity and traffic to the social publishers in the social network. The level of social influence may also be based on the level of social influence or the number of social publishers with whom the social publisher interacts.

The method further may include selecting certain groupings of the social publishers having the desired social characteristics and then an offer of an opportunity to display information indicative of the brand within their respective social content. The method may also provide for allowing the brand promoter to assign a value for displaying by the social publishers the information indicative of the brand within social content generated by the social publishers. The assigned value may be an amount per impression. The selected social publishers may accept the offer and be compensated for displaying the brand within their social content. In some embodiments, the social publishers may agree to display the brand for a specific period of time or specific number of page impressions. The social network may also be compensated for allowing the brand to be displayed within the social content of its social publishers. The compensation may be based on the value created for the brand by the social publishers displaying information associated with the brand within their social content.

In some embodiments, the method may further include aggregating information about the social publishers including personality traits of the social publishers. The personality traits may be defined in part by a self-assessment of the social publishers. The self-assessment may include questions presented to the social publishers related to age, sex, social affiliations, and leisure preferences of the social publisher. The questions may further include a personality model such as a Myers Briggs like model.

In other embodiments, a method of building an online brand campaign is provided. The method includes storing brand art suitable for displaying in a network environment and receiving an input indicative of a budget for the online brand campaign. The budget may include a bid amount for each page served having impressions of the brand. User selectable options are presented to allow selection of target attributes for brand association and input selecting one or more of the target attributes is received into the system. The target attributes may include a minimum social influence level of a social publisher which may be deemed suitable for displaying the brand art. The online brand campaign may be activated, and social publishers suitable for displaying the brand art may then receive a sponsorship offer to display the brand art.

In response to the input, a campaign fulfillment metric may be sent to a brand promoter, where the campaign fulfillment metric comprises an estimated reach and burn rate of the online brand campaign. The estimated reach and burn rate may be defined in part by a number of social publishers suitable for displaying the brand art and an estimate of sponsorship acceptance by the social publishers. The estimate of sponsorship acceptance may be measured in part based on the competitiveness of the bid amount and the social influence level of the social publishers suitable for displaying the brand art. When the budget is exhausted or the time expires for the online brand campaign, the brand promoter may receive a notification. In response, the brand promoter may modify the online brand campaign to extend it further.

In another embodiment, a system is provided for enabling a brand promoter using a computer network to create a brand advertising campaign. The system may include an online persona definition module configured to receive information about a social publisher and, based on the received information, associate personality traits with the social publisher. The system may also include a social influence measurement module configured to measure social network metrics and social network activities related to the social publisher, and based on these measurements determine a level of social influence for the social publisher. In some embodiments, there may be a brand promoter management module configured to receive data from the brand promoter. The data may include targeting elements for the advertising campaign such as, for example, a level of social influence and a set of personality traits. The data may also include brand art to display within the social network and a sponsorship offer with a bid amount per page view on social content meeting the targeting elements. The brand promoter management module may also be configured to allow the brand promoter to establish an account and deposit funds into the account.

In certain embodiments, the system may include an association module configured to determine if the social publisher meets the targeting elements, and an offer selection module configured to display the sponsorship offer to those social publishers meeting the target elements. The association module may also periodically determine whether the social publisher still meets the targeting elements. If the social publisher no longer meets the targeting elements, the association module may withdraw the sponsorship offer from the social publisher. The offer selection module may be configured to allow the social publisher to select a sponsorship offer, thereby causing the brand art to be displayed among social content of the social publisher. In some embodiments, the offer selection module may be further configured to allow the social publisher to select a preferred sponsorship offer or to automatically select the sponsorship offer having the highest bid amount. When the brand art is displayed, the social publisher may receive compensation based on the bid amount for each page view of the brand art displayed among the social content. The compensation may be monetary or reward points. The bid amount may be a monetary value. In some embodiments the deposited funds in the account may be transferred to the social publisher when the brand art has received a predetermined number of impressions.

In other embodiments, a system of associating a brand promoter having a brand with a plurality of social publishers who produce social content is provided. The system may include means for receiving, from the brand promoter, desired social characteristics of social publishers to be associated with the brand. It may also include means for selecting certain ones of the social publishers having the desired social characteristics; and means for sending, to the selected social publishers, an offer of an opportunity to display information indicative of the brand within their respective social content.

In yet another embodiment, a computer-readable medium having computer-executable instructions stored thereon, that when executed by a computer cause the computer to perform a method of associating a brand promoter having a brand with a plurality of social publishers who produce social content. The method may include receiving, from the brand promoter, desired social characteristics of social publishers to be associated with the brand. The computer readable medium may further include instructions for selecting certain ones of the social publishers having the desired social characteristics and sending an offer of an opportunity to display information indicative of the brand within the content of the social publishers.

BRIEF DESCRIPTION OF THE DRAWINGS

In this description, reference is made to the drawings wherein like parts are designated with like numerals throughout.

FIGS. 11A-11C depict examples of how brand promoters may create, define, and manage brand ad campaigns.

FIGS. 12A-12F provide an illustration of a website that allows social publishers receive and manage sponsorship offers from brand promoters.

FIGS. 13A and 13B depict a method of associating a brand promoter having a brand with social publishers who produce social content.

DETAILED DESCRIPTION OF CERTAIN INVENTIVE EMBODIMENTS

Figure 1A:
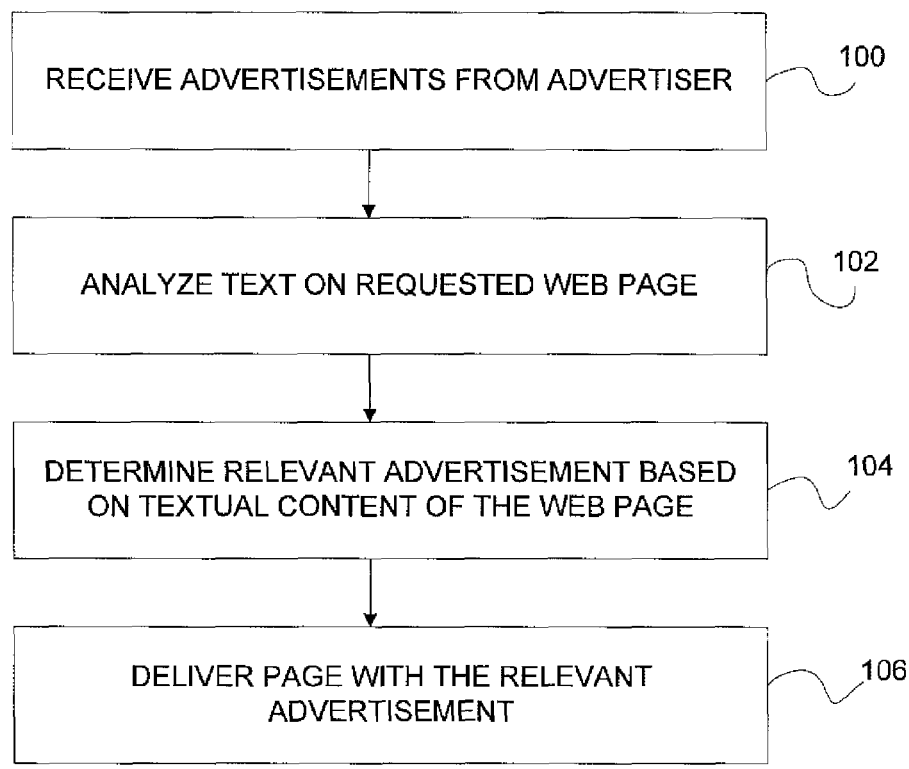
FIGS. 1A and 1B depict prior art methods for serving advertisements in websites.
Figure 1B:
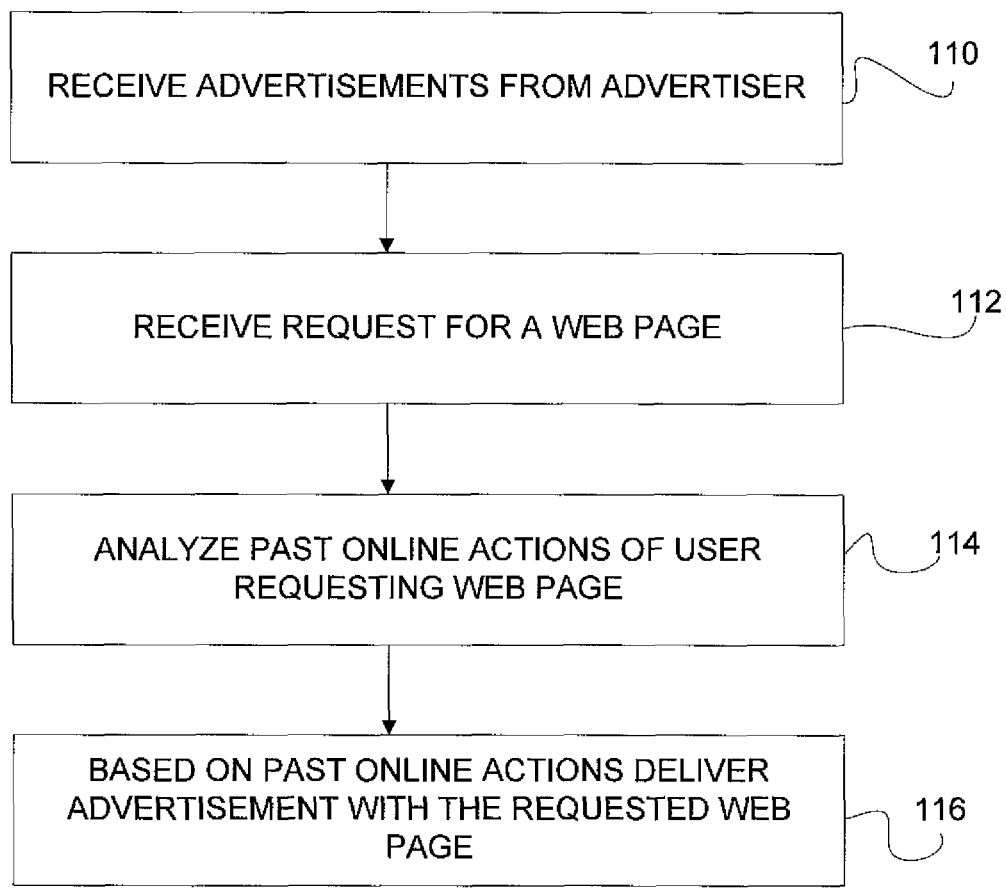

One or more aspects of the invention involve connecting brands and social publishers within social networks by defining online personas for social publishers and allowing brand promoters to specify desired characteristics of social publishers of social content which can amplify their brand.

As used herein, a social publisher may be any person, group, or organization that produces, creates and makes available social content. One example of a social publisher may be a user or member of a social network. Another example of a social publisher may be a proprietor of a website or a blog. Social networks may comprise one or more social networking websites which may typically offer an interactive network that includes various combinations of web logs (blogs), user groups, photos and e-mail, music, video, art, commentary or some other content. Users sign up to use the social network and maintain personal websites that project an image and ostensibly reflect "who they are." Users of social networking websites may be referred to as social publishers. Typically, the website maintained by a social publisher includes social content customized according to the social publisher's preferences and tastes and desire to "brand" themselves.

As used herein, social content may be any content that is created by a social publisher. Social content may also be referred to as "user-generated content." An example of social content may be content produced that creates an online image for the publisher. Social content may take the form of text, graphics, video, or any other electronic form. Social content may also be presented in the form of a blog, an online journal, an e-mail message, a photograph, an illustration, a sound file, a video file, or some other combination of electronic content. A brand may be a symbolic embodiment of all information connected with a product or service. A brand typically includes a name, logo, and other visual or audio elements such as images sounds or symbols. A brand may also encompass the set of expectations in the mind of the consumer which are typically associated with a product or service. A "brand promoter" is any person, group, organization or other entity which seeks to enhance the value of a brand.

Although brand promoters have historically found many challenges in leveraging social content for brand promotion or advertising, the mediums utilized in social content create an influential experience for the viewer that parallels many, if not all of, the ways in which brands attempt to influence their audience. In spite of these parallels, advertising within social content has historically presented a paradox for brand advertisers—it is too fragmented and difficult to categorize to be efficiently and effectively integrated with proper brands, yet, if made safe to associate with, social content could be a promising potential medium for reaching brand consumers.

Social content may be leveraged by brands to reinforce their message by association with appropriate individuals. One of the primary reasons of the popularity of social networking sites is that social content allows social publishers to deliver their image to any web user visiting their site. The image of the individual is communicated through the music they choose, the pictures they show, friends they have and the things they associate with. In short, social advertising is how people brand themselves; how they tell their story.

Brands use people to tell their story; "Jessica Simpson has this phone. Madonna shops here. Lance Armstrong drives this truck." What these celebrities have in common is that brands desire association with the image portrayed by these celebrities. This was how brands built image in the broadcast model of advertising. Brands could develop one-to-one relationships with the celebrities that best fit the image they were trying to convey. Often brands don't even need real celebrities, rather they choose to create them and therefore control an individual or situation which typifies their brand image and broadcast their creation.

The democratization of media has made it increasingly difficult to deliver and control a brand's message. However, social media, which is seen as a problematic platform by brands, can provide the answer. A whole new type of celebrity is being born, the social publisher celebrity. It is Mike; the most popular guy in Albany High School in Albany, N.Y. It is Kate in Topeka; who always seems to know everything about clothes. It is Jim in Seattle; who never stops talking about trucks. Through social networks, brands have the capability to interact with these online social celebrities and perceived subject matter experts. Many people use brands to tell a story; "I have this phone. I shop here. I drive this truck". What brands need is a system to ensure that they reach and associate with Mike in Albany, Kate in Topeka, Jim in Seattle and the millions of other social celebrities who enhance their brand's image, especially when the brand can be part of telling that individual's story to their world.

Brand-Association-Capable (BAC) Social Network

Figure 2A:
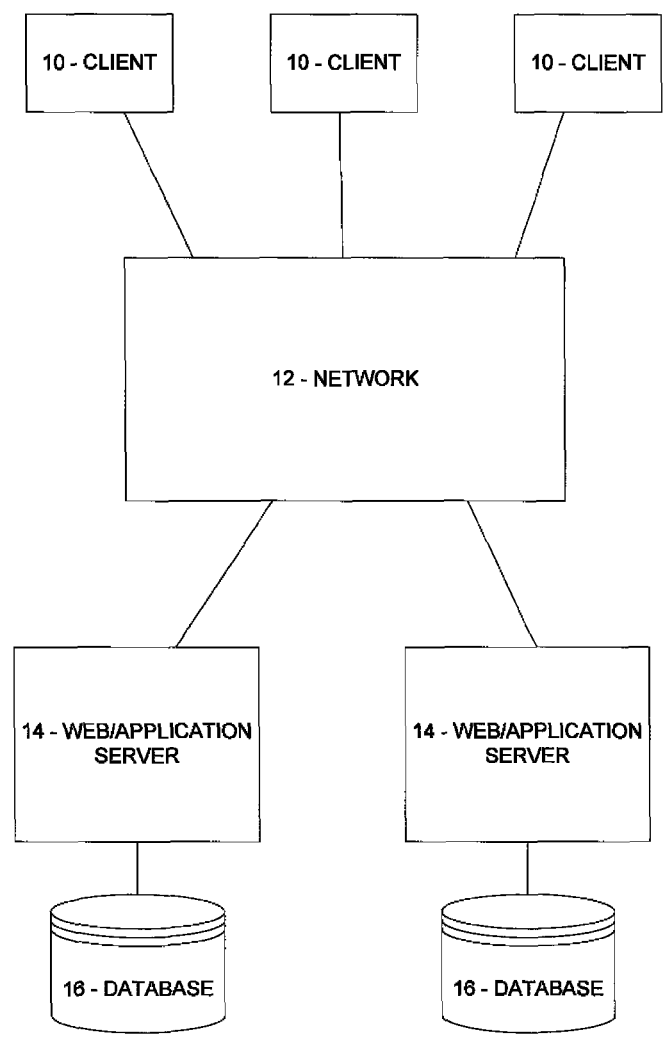
FIGS. 2A-2C provide an illustration of how social publishers may interact with each other within a social network.

Referring now to FIG. 2A, an example of a computing environment suitable for practicing aspects of the invention is provided. The environment includes a network 12 that may be accessed by connect various client computers 10. The network may be any suitable data communications network, such as the Internet for example. Client computers 10 may take various forms. The client computers may be personal computers running an operating system such as Windows, Linux, or MAC/OS. The client computers may also be handheld computers or cell phones. In sum, the clients may include any computing device that is capable of accessing the network 12. The environment also may include one or more web/application servers 14 which may be coupled to databases 16. Web/application servers 14, possible in conjunction with databases 16, may be used as a platform for maintaining various network applications such as social networks. Client computers 10 may access the network applications using software such as, for example, a web browser, or some other software that can access content stored on the web/application servers.

In one embodiment, a brand-association-capable ("BAC") social network is configured to allow brands to confidently interact with social publishers to carry their brand message to consumers. The social network may include a plurality of online communities that are focused on various subjects that may be of interest of social publishers that join the BAC social network.

Figure 2B:
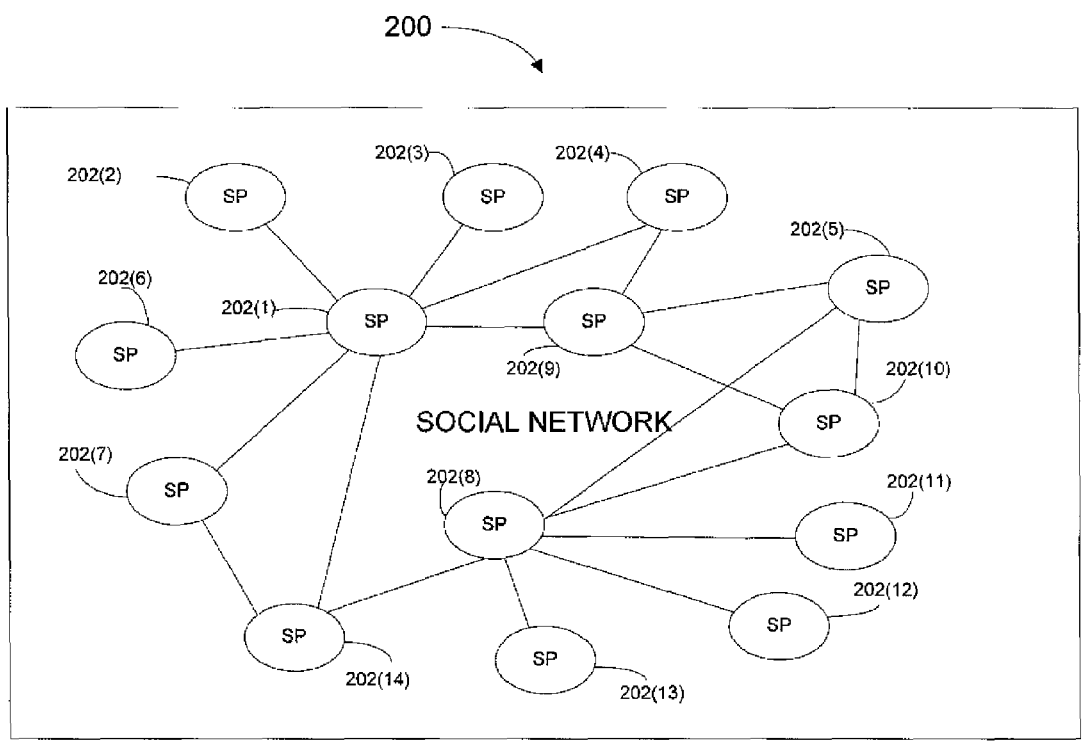

FIG. 2B illustrates an example of a social network 200 in which various social publishers 202(1) ... 202(x) are connected in some with each other. One of skill in the art will appreciate that an online social network may be implemented utilizing any number of different technologies, and that the particular hardware/software implementations described herein are not intended to be limiting in these respects. In one embodiment, the social network may include a plurality of front end web servers connected to the Internet that serve web pages in response to requests made by web browser clients. The front end web servers may store data about the social publisher websites, or they may access, through some scripting language (such as PHP or PERL, for example) or middleware application (such as ColdFusion or .NET, for example), the data which may be stored on back end database servers. The database servers may, for example, store social publisher data on ODBC-compliant relational database software such as MS SQL or some other relational database. The back end may also include a non-relational database such as an object-oriented database, or some other form of data storage. In addition, data stored within the system may be accessed and modified through use of applications written in any of a number of programming languages or development environments such as C, C#, .NET, ASP, Delphi, or some other software programming language.

A social network 200 such as that provided in FIG. 2B may have many social publishers 202 associated with the social network 200. The lines between the social publishers represent social interactions that the social publishers 202 have with one another. Social interactions may be a form of social activity. Social activity, in addition to including social interactions, may also include alterations made by a social publisher to their own social content. A social interaction between two social publishers 202 may take many forms in the social network 200. For example, a social interaction may be a comment left on a social publishers social content by another social publisher. A social interaction may also include a link to another social publisher's site. Social interactions may further be created by a social publisher when he creates a list of "friends" and provides links to their social content on his website. In addition, a social interaction may be considered to be one social publisher, or any other potential viewer of social content, visiting online the blog, photos, videos, or some other social content of another social publisher. In this sense, social interactions in the social network 200 may grow virally, as each social interaction gives rise to the opportunity to create another social interaction.

By way of an illustrative example, in the mapping of social interactions provided in FIG. 2B, social publisher 202(1) may have seven different social interactions with social publishers 202(2)-(4), 202(6)-(7), 202(9) and 202(14) as shown in the Figure. The social interaction with social publisher 202(2) may be a "friend" link. The social interaction with SP 202(4) may be a message or comment left by SP 202(4) on a bulletin board within the social content of SP 202(1). Social interactions may also include messages sent among social publishers (via e-mail or an internal messaging system). In one embodiment, the social activity of a particular social publisher 202 may be used as one data set to define or determine a social influence value as will be discussed in further detail below.

Figure 2C:
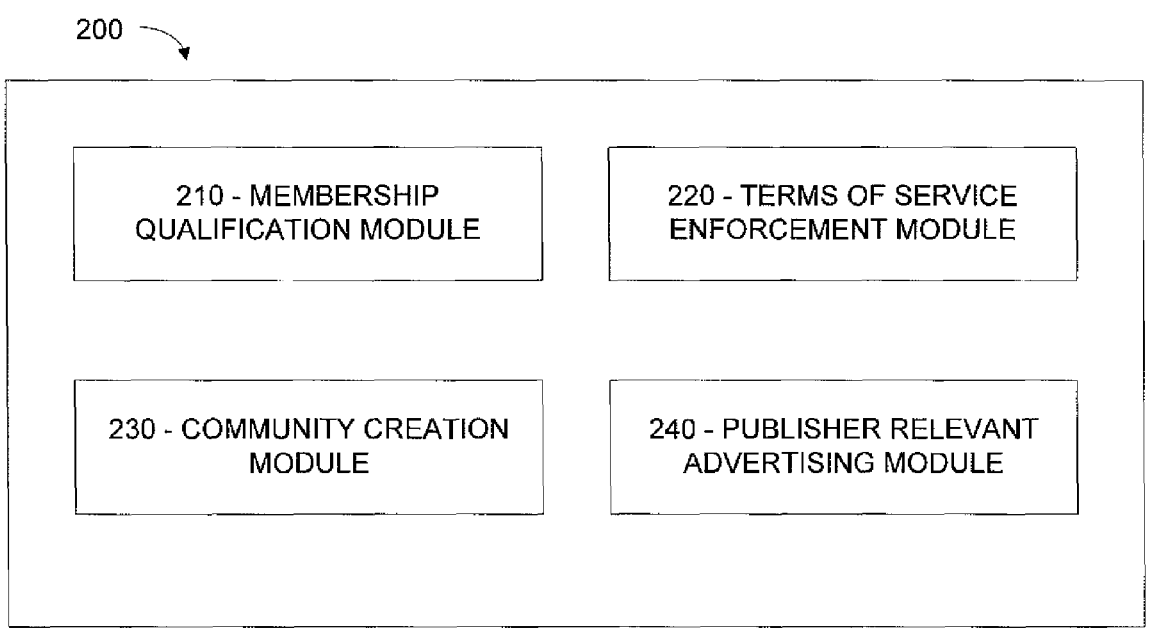

FIG. 2C provides a block diagram which illustrates various modules that may be included in the BAC social network 200 in accordance with various embodiments. As discussed above, one of the primary obstacles that brand promoters encounter in attempting to leverage social networks for promoting brands is that they have no control over the content that a social publisher chooses to display on his site. Thus, a brand promoter risks harming its brand by associating with a social publisher that publishers content inappropriate to the brand.

In order to address these and other issues, the BAC social network 200 may include various safeguards and modules to help ensure that content published within the BAC social network 200 is appropriate for brand promotion. Among these measures may be a member qualification module 210. The membership qualification module may be configured to screen and qualify members of the BAC social network 200.

The module may be a software module that is configured within the BAC social network 200, and implemented via the web-based technologies described above. In one embodiment, the BAC social network may be initially populated with social publishers by utilizing an initial invitation scheme that focuses on the recruitment of brand appropriate individuals. The initial BAC social network members 202 may be targeted based on their online or real world recognized expertise in a particular subject area that may be of interest to brand promoters that may wish to advertise on the website. For example, a professional baseball player might be recruited to create and regulate a niche community about baseball. If the online/real world celebrities join the BAC social network 200 as social publishers 202, they may be assigned as a facilitator to a network community. Community facilitators act as moderators for their community and will be discussed in greater detail with reference to FIG. 3 below.

In one embodiment, the membership qualification module 210 may be configured to require conclusive proof of identity for anyone which wishes to become a social publisher 202 on the BAC social network 200. The system may be configured to prompt the prospective network member/social publisher to enter uniquely identifying information such as a social security number, for example, along with possibly a credit card to help ensure the identity of that new member. Requiring proof of identity of new members allows for more efficient future enforcement of terms of service violations as will be discussed in more detail below. Having received the information from the user, in one embodiment, the membership qualification module 210 may utilize the information to verify the existence of the social publisher by running a credit check or some other type of verification algorithm.

In order to make prospective members more willing to provide their verification data, various incentives may be presented to the social publisher. In one embodiment, the BAC social network 200 may offer social publisher eligibility for events sponsored by the BAC social network 200. In another embodiment the social publisher may be offered the opportunity to share in revenue streams derived from advertising with their social content. Initial BAC social network members may also be provided with the opportunity to influence the selection of brand sponsorship on the site. In other embodiments, the membership qualification module 210 may simply provide the social publisher 202 with information indicating that such disclosure is necessary to belong to an online community which ensures the identity of all participants with whom the social publisher may choose to interact.

The BAC social network 200 may also include a terms of service enforcement module 220 which is used to enforce the terms of service ("TOS") that may be agreed to be each social publisher 202 prior to becoming a member of the BAC social network. The TOS enforcement module 220 may take the form of a software module that enables editorial staff to monitor social content produced by the social publishers 202 in a systematic and regular basis. In addition, the TOS enforcement module 220 may be further configured to provide incentives to social network members with incentives to police each other and report abuses of the TOS. Additional discussion of these details may be found below with reference to FIG. 12.

Community Creation/Management

As noted above, once the initial "celebrity" social publishers 202 have been recruited and joined the BAC social network community 200, they may serve as community facilitators for the social network. As community facilitators, the social publishers 202 may be allowed or encouraged to grow the membership of the social network 200 by inviting additional social publishers to join their community. In one embodiment, invitations are issued and managed through an affiliate system which limits the number of new member that any existing member may bring to the BAC social network. In one embodiment, the social publisher who invites a new member to join the network may be held responsible for TOS violations committed by those whom they invite into the network. This type of a policy may help to ensure that the members in the BAC social network community 200 carefully consider those whom are invited to join the social network 200.

BAC social network 200 may also include a community creation and management module 230 which allows sub-communities to be created that are related to the broader communities established and facilitated by the celebrity social publishers 202.

Figure 3:
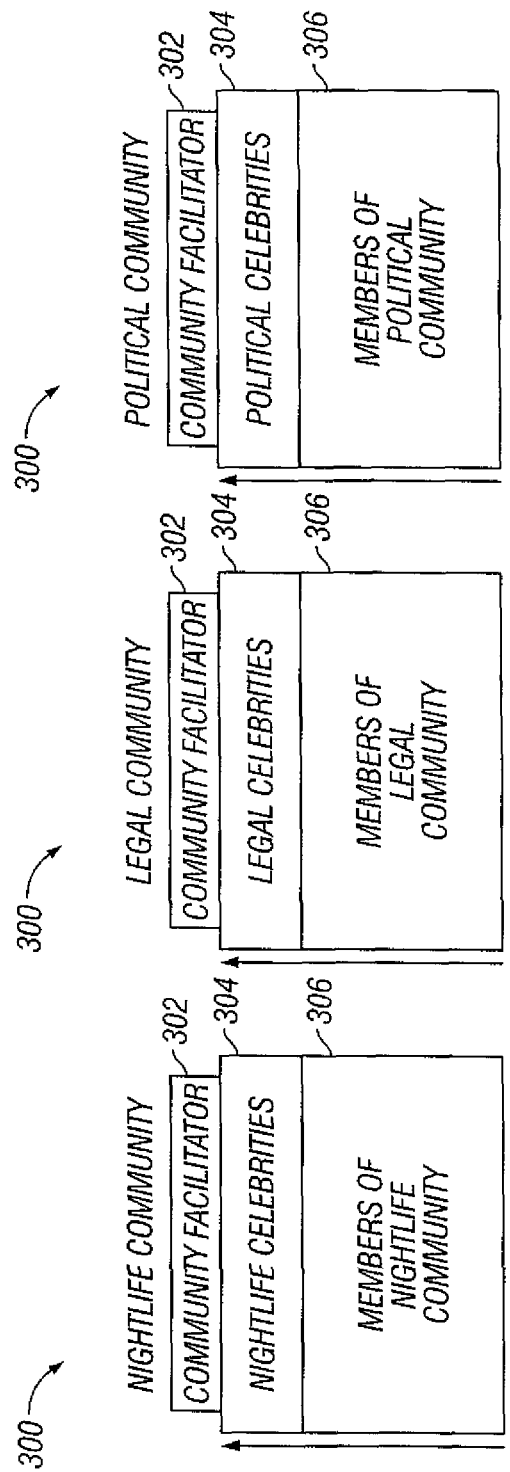
FIG. 3 illustrates components of a social network in accordance with one or more aspects of the invention.

Referring now to FIG. 3, an illustrative example of how three broad communities 300 may be logically structured is provided. Each broad community may include a community facilitator 302 at the top level. As discussed above, the community facilitator may be an online or real world celebrity or subject matter expert recruited into the BAC social network. As additional members are recruited into each broad community, they may be categorized as either celebrity members 304 of the community 300, or as ordinary members 306 of the community.

In one embodiment, the new social publishers 202 whom have joined the community 300 may be categorized based on their level of social influence. Social content of the social publishers 202 may be made available through a community directory or through some other identification protocol. As will be discussed in further detail below, the a social publisher's level of social influence may be derived from any one of several factors, including but not limited to inbound links to their social content, the number of "friends" they have within their community, the community activity and contributions of the social publisher 202 to the betterment of the community.

Thus, those social publishers that become well known or contribute to the community may be perceived by other social publishers as having a degree of subject matter expertise within the community. Social publishers 202 within the BAC social network 200 achieving such notoriety may be re-categorized from the ordinary member 306 category to the celebrity category 304.

Figure 4:
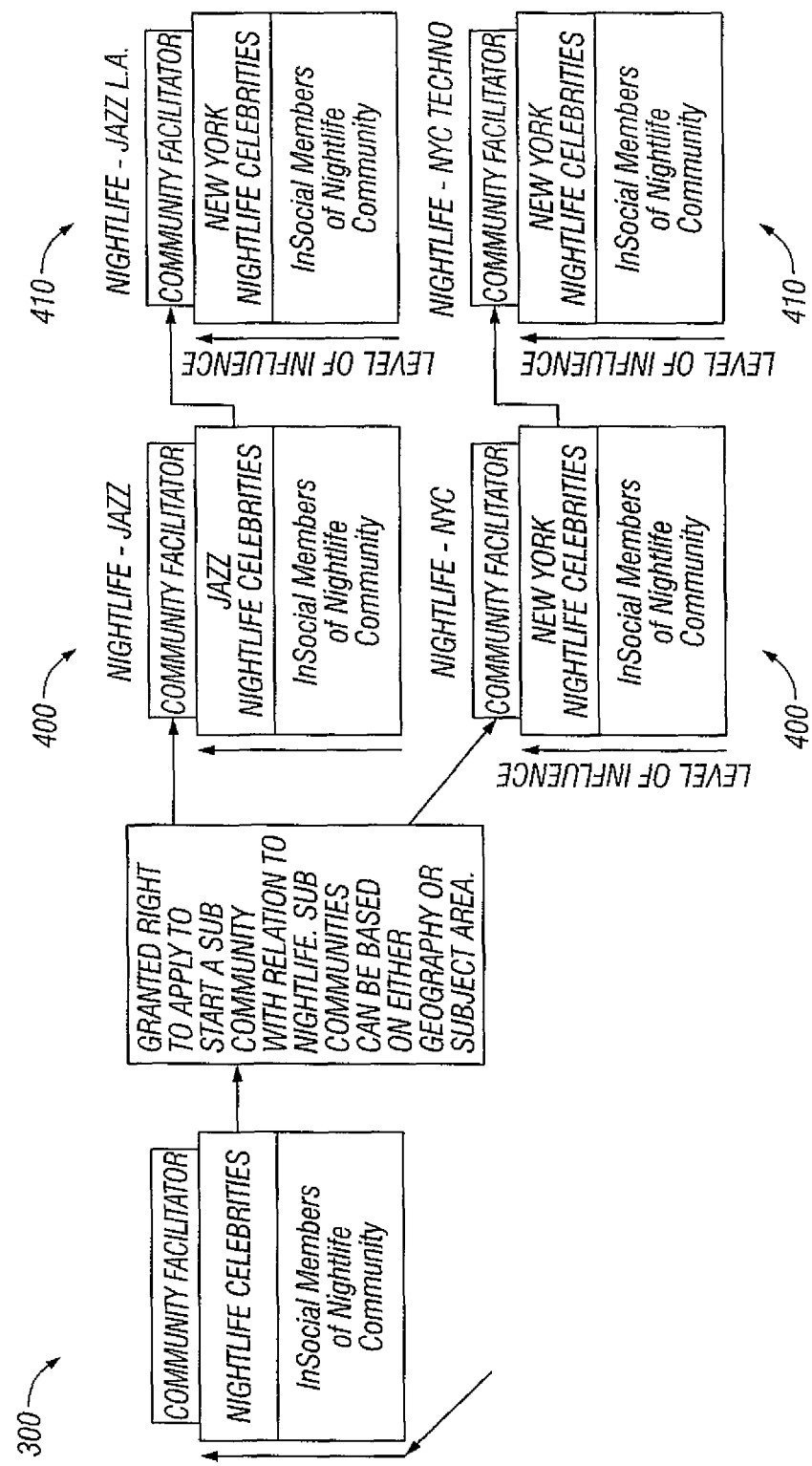
FIG. 4 provides an illustration of how various social communities may be created and organized in the social network from FIG. 3.

In one embodiment, those social publishers 202 categorized as community celebrities 304 may be permitted to create sub-communities that are related to the broad community 300. FIG. 4 illustrates how sub-communities 400 may be created based as a subset or offshoot of a broader community 300. In the example provided, one or more Nightlife Celebrities 304 from the Nightlife Community 300 have created sub-communities 400. The Nightlife Celebrities 304 become community facilitators 402 for the sub-communities 400. In one embodiment, the sub-communities may be based on a geographical location, as shown by the "Nightlife NYC" sub-community 400. Alternatively, a sub-community 400 may be topical, and based on an area of subject matter. In these instances, the sub-community may carve out a more specific subject matter area than the broader community 300. In addition, sub-sub-communities 410 may be created that further carve out specific subject matter of interest to those within the BAC social network community.

Publisher Relevant Advertising

Figure 5:
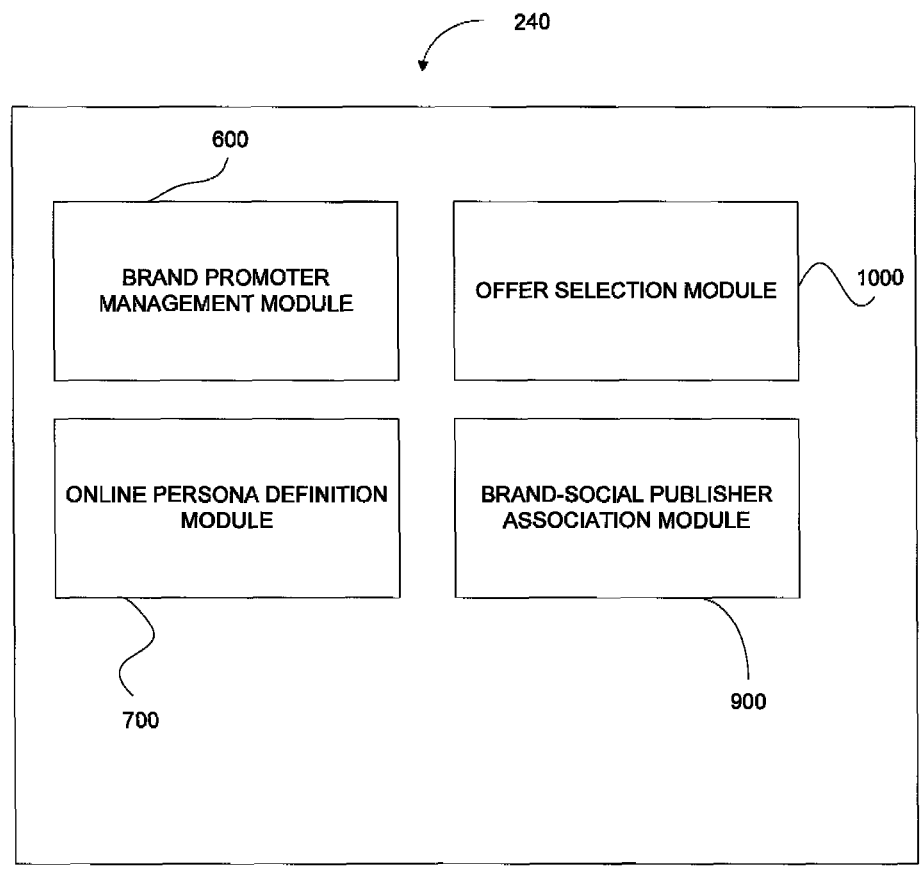
FIG. 5 depicts a block diagram including various components of a personality-relevant advertising module.

Another aspect of the BAC social network 200 provides for a publisher relevant advertising module 240 which allows brand promoters to target for sponsorship those social publishers 202 who project an image that effectively represents, reinforces, or enhances the brand's image. Although the relevant advertising module 240 is described as a component of BAC social network 200, one of skill in the art will readily appreciate that the publisher relevant advertising module 240 may be implemented as a standalone module that interacts with various social networks or standalone social content. In this embodiment, brand promoters may specify social traits of social publishers (which may be derived from self-assessments by the social publisher) with whom they would like to associate their brand. Brand promoters may further specify a level of social influence (which may be derived from social activity of social publishers) with whom they would like to associate their brand. Brand promoters may further specify demographic attributes for the social publishers with whom they would like to associate their brand. Once the brand promoter has defined the desirable social attributes (social traits, social influence and demographic) the brand promoter may bid to have their sponsorship offers distributed to relevant social publishers. The publisher relevant advertising module 240 then selects social publishers that fit (either exactly, or to some degree of proximity) the specified image and offers the social publishers the opportunity to be sponsored (e.g. receive compensation or some benefit) by the brand promoter to display the brand within their social content. The compensation provided to the social publisher may take various forms. In one embodiment, the benefit may simply include an ability to influence the brand content displayed within their social content. In other embodiments, the social publisher may receive some form of brand specific perk or access. For example, the social publisher may receive promotional items from the brand promoter or access to promotional events. In yet another embodiment, the social publisher may receive monetary compensation. FIG. 5 is a block diagram of various components of the publisher relevant advertising module 240, each of which will be discussed in further detail below in connection with FIGS. 6-10. Although the publisher relevant advertising module 240 is generally described herein as being part of the BAC social network 200, one of skill in the art will readily appreciate that the publisher relevant advertising module 240 may also be a stand alone module that is not tied to any specific social network.

Figure 6A:
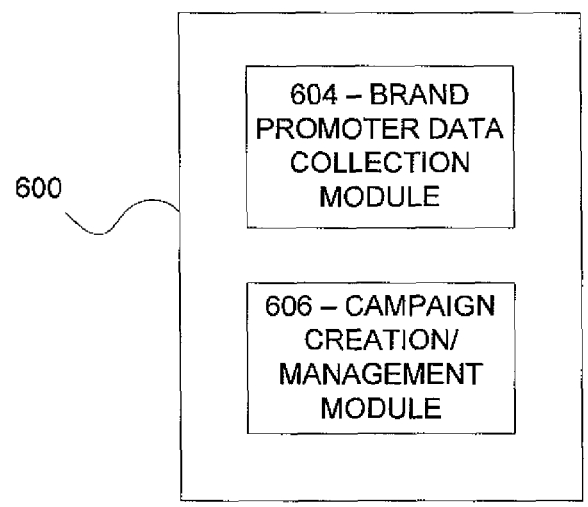
FIGS. 6A-6C depict a more detailed view of a brand advertising campaign management module.

The publisher relevant advertising module 240 may include a brand promoter management module 600 which allows brand promoters to create and manage advertising campaigns for their brands. Referring now to FIG. 6A, a block diagram showing some potential components of the brand promoter management module ("BPM") module 600 is provided. The BPM module 600 may include a data collection module 604 which collects relevant data from brand promoters. The BPM module 600 may also include a campaign creation/management module 606 which allows brand promoters to define advertising campaigns within the system. An example of an interface for accessing the BPM module will be discussed in further detail below in connection with FIG. 11B.

Figure 6B:
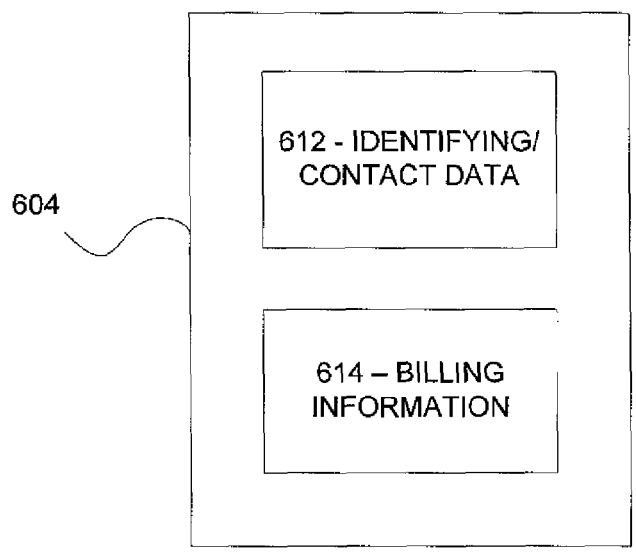

Referring now to FIG. 6B, a more detailed view of the brand promoter data collection module 604 is provided. The data collection module 604 may be a software process configured to collect and store data about brand promoters when they sign up to use the system. The brand promoter data may include data such as a user name and password used for online authentication. The data may further include contact information. Contact information for brand promoters including a corporate address, email, phone number, and other contact information. The contact information may be used to inform brand promoters of events affecting various campaigns, such as expiration of ongoing campaigns or billing issues. Standard billing information may also be collected from brand promoters via the collection module 604. The billing information may include data that allows the system to receive payment from brand promoters and notify brand promoters of payments made and payments due.

Figure 6C:
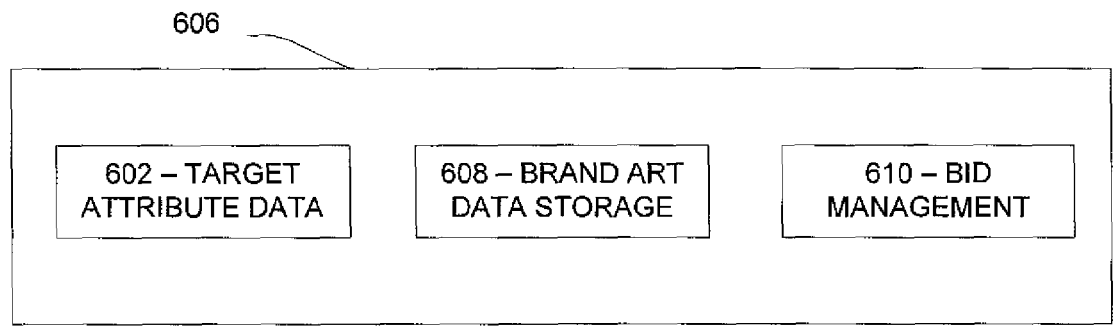

Referring now to FIG. 6C, a detailed example of the campaign creation/management module 606 is provided. The campaign creation/management module 606 may be a software module that allows brand promoters to modify existing advertising campaigns that they have created in the system, and will be discussed in further detail below in connection with FIG. 11C. The campaign creation/management module 606 may store or utilize target attribute data 602. Target attribute data 602 may include various social attributes. These attributes make take various forms. In one embodiment, the attributes may be publisher types. In another embodiment, the attributes may include social tendencies, e.g., athletes, skaters, ravers, artists, clubbers, etc. The target attribute data may also include geographic attributes such as regions, cities, states, or other geographic delineations. Target attributes may also include age ranges, sex, income level, or some other demographic or psychographic attribute. The campaign creation/management module 606 may also include brand art data storage 608 which allows the brand promoter to upload brand art into the system and store it for use in brand campaigns that it defines. Finally, the campaign creation/management module 606 may include a bid management module. The bid management module may be configured to store electronic currency, and allows the brand promoter to distribute his electronic currency among various brand campaigns as will be discussed in further detail below in connection with FIG. 11A-11C.

Figure 7:
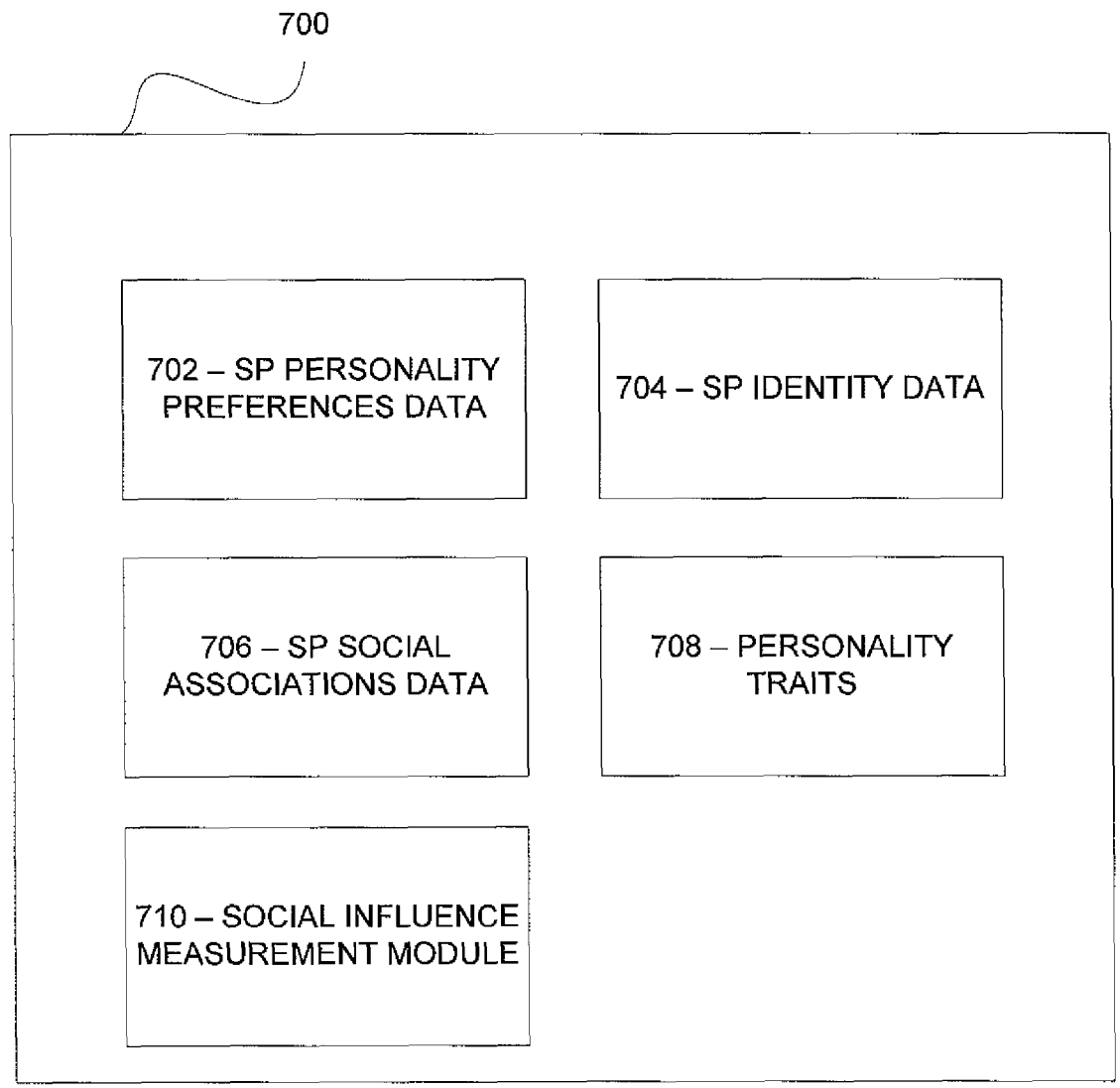
FIG. 7 depicts a more detailed block diagram of an online persona definition module.

The publisher relevant advertising module 240 may also include an online persona definition module 700. The online persona definition module may create data which may be used by the brand-social publisher association module 900 (as will be discussed in further detail below) to associate social publishers with appropriate brands. FIG. 7 is a block diagram of components of an online persona definition module 700 according to one or more embodiments. The online persona definition module is used by social publishers to create their online persona or profile. The created profile is then used by the brand/social publisher association module 900 to match social publishers 202 with brand promoters seeking to sponsor social publishers having specified social attributes.

In one embodiment, the online persona definition module may be software configured to present social publishers with a series of questions. The responses given by the social publisher may be used by the system to generate a social profile for each social publisher. Various techniques for defining the social characteristics of the social publishers may be utilized. In one embodiment, the social publishers may be given a self-assessment questionnaire. The questions may relate to various publisher lifestyle, leisure and product preferences. The answers given by the social publishers 202 may be stored as social publisher personality preference data 702. In one embodiment, the system may present questions in the form of a Myers-Briggs-like test which helps to define personality traits of the social publisher 202. The persona definition module 700 may also be configured to receive identity data 704 from each social publisher. The identity data 704 may include information such as the name, hometown, high school, college, or other personal data. The persona definition module 700 may also be configured to receive social association data 706. The social association data 706 may include information relating to the social activity of each social publisher 202 in the social network. For example, the social association data 706 for a social publisher 202 may include their "friends" within the social network, their incoming links, their incoming messages, or some other data.

The online persona definition module 700 may create an online persona definition 708 for each social publisher based on the received personality preferences data 702, the identity data 704, and the social associations data 706. In one embodiment, the online persona is generated from this data to assign values for each social publisher 202 in some or all of the attributes that are available to brand promoters as target attributes 602 described above. Thus, the generated online persona 708 of each social publisher 202 may be compared against the target attributes of brand promoters 602 to determine whether the online persona of the publisher is a match. The online personal definition module 700 may also include the publisher relevant advertising module 240 may also include a social influence measurement module 710. The social influence measurement module may be a software module that is configured to analyze various data about each social publisher 202 to determine their degree of influence within the social network 200. The social influence measurement module may take the form of an application module or sub-module which receives various pieces of data and analyzes them to generate a social influence value. Those social publishers 202 with greater social influence values will typically be more desirable for brand promoters as spokespersons for their brands. In one embodiment, the social influence measurement value is generated by gathering data regarding various measurements of social activity within the social network. The social influence measurement module 710 may be configured to analyze each social publisher 202 within the network periodically to recalculate their social influence value, which may change over time.

Figure 8:
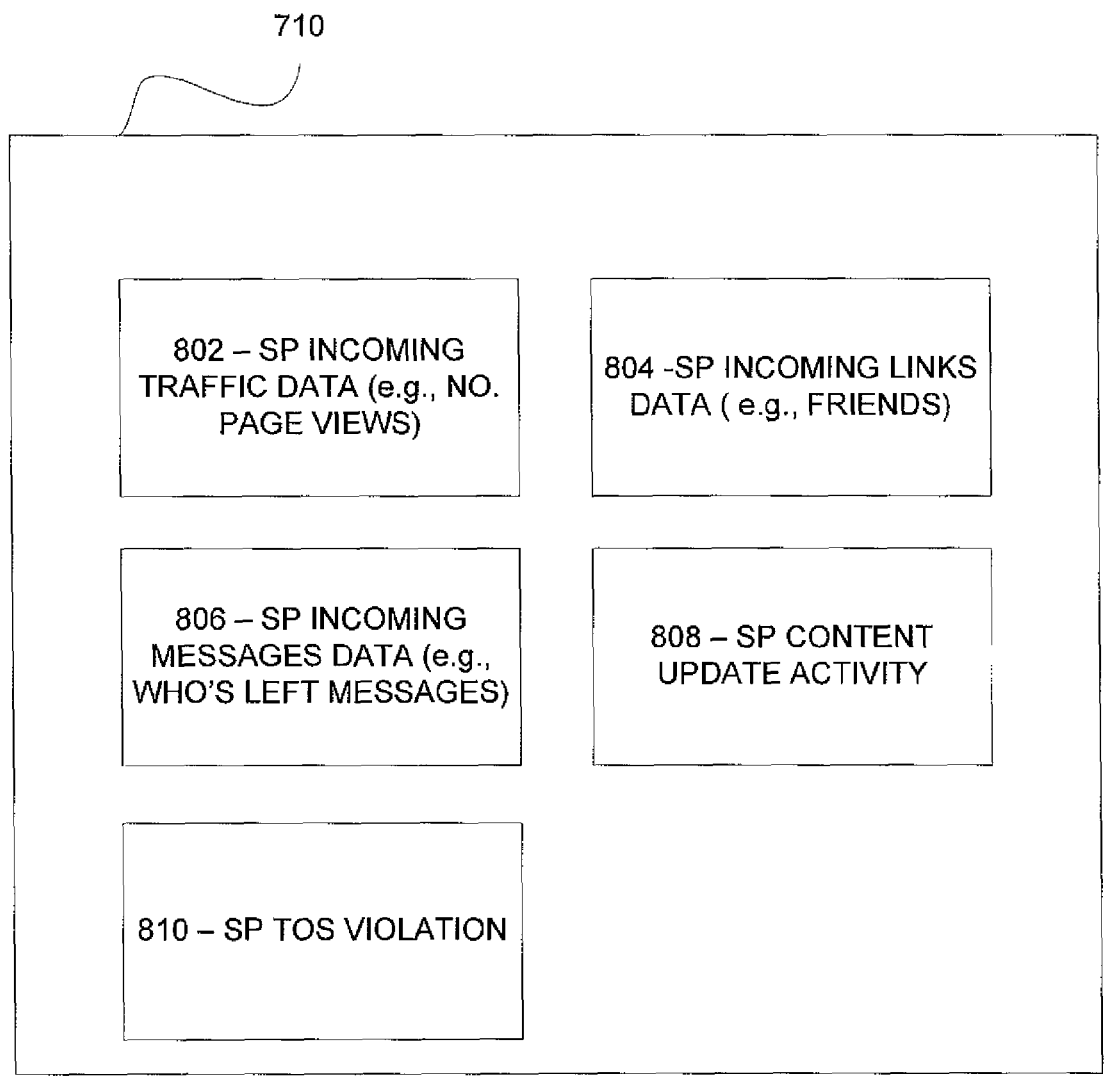
FIG. 8 depicts a more detailed block diagram of a social influence measurement module.
Figure 9:
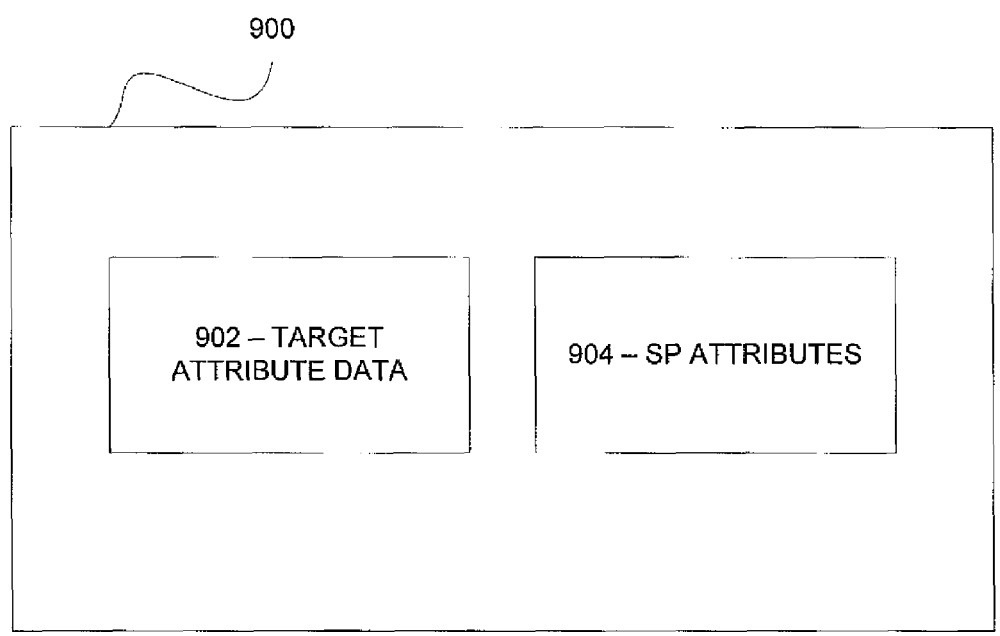
FIG. 9 depicts a block diagram illustrating a brand/social publisher association module.

Referring now to FIG. 8, a more detailed view of the social influence measurement module 710 is provided. The social influence measurement module 710 may receive incoming traffic data 802 for each social publisher. This data may simply be a measurement of the number of page views on the social content of the social publishers, or it may also include the referring pages. The social influence measurement module 710 may also measure the number of incoming links 804 for each social publisher 202 to provide an indication of their popularity within the social network. Another metric that may be utilized by the social influence measurement module 710 is incoming message data 806. This data may include the number of incoming text or e-mail messages that the social publisher 202 receives over the social network 200. This data may also include the social influence measurement, if available, of the persons sending the messages to the social publisher 202. Thus, if the social publisher is receiving messages from more influential users within the network, it may be safe to presume that the social publisher also carries a degree of influence within the community. Because social networks suffer when the content of social publishers is stagnant or stale, the social influence measurement may also include content update data 808 which measures the frequency of updates of the social publisher's social content. A social publisher that adds new content to his website frequently will generally receive a higher value than a social publisher that updates only periodically. In some embodiments, the module may be configured to detect social publishers 202 who attempt to generate in increased value by spamming or by generating some other form of valueless content. The social influence measurement module 710 may further include social publisher terms of service violation data 810. TOS violation data is data that relates to violations of the terms of service of the social network 200 or of the advertising module 240 by social publishers.

The social influence measurement module 710 may take all of the data described above and use the data to create a social influence ranking or measurement for each user. In one embodiment, the module 710 ranks each social publisher by each of the categories of data on a scale of 1-10. By way of example, a social publisher 202 that is in the top 10 percent of incoming traffic will receive a 10 ranking in that category. However, if that same publisher does not have many "friends" in the social network, and is only in the top 50 percent of social publishers, they may receive a 5 ranking for that category. Similarly, if a social publisher 202 is in the top ten percent of incoming links (as determined by the SP incoming links data 804), they may receive a 10 ranking in that category. Once a ranking has been determined for each of the different metrics, they may be combined or averaged into a composite social influence value or level. The metrics may be assigned each the same weight in determining the composite social influence value, or they may be assigned different weights. Thus, each social publisher 202 within the social network 200 may receive a regularly updated social influence value which may be used to determine brand sponsorship offers for which they might be eligible.

The personality relevant advertising module 240 may also include a brand-social publisher association module 900. The association module 900 is designed to match up social publishers with brands based on attributes of the social publishers as defined by the online persona definition module 700 and the target attributes provided by brand promoters for their campaigns via the brand advertising campaign management module 606.

In one embodiment, the association module 900 receives target attribute data 902 for active brand campaigns. The target attribute data 902 may have been defined by the brand promoter when defining or creating the brand campaign (as was previously discussed with reference to FIG. 6). The association module also may include attribute data 904 for the social publishers 202 which may include the data generated by the online persona definition module 700. As discussed above, the data generated by the online persona definition module may include a social influence ranking generated by the social influence measurement module 710. In some embodiments, brand promoters may specify that they want their brand to be associated only with those social publishers 202 that have not had any TOS violations.

Figure 10:
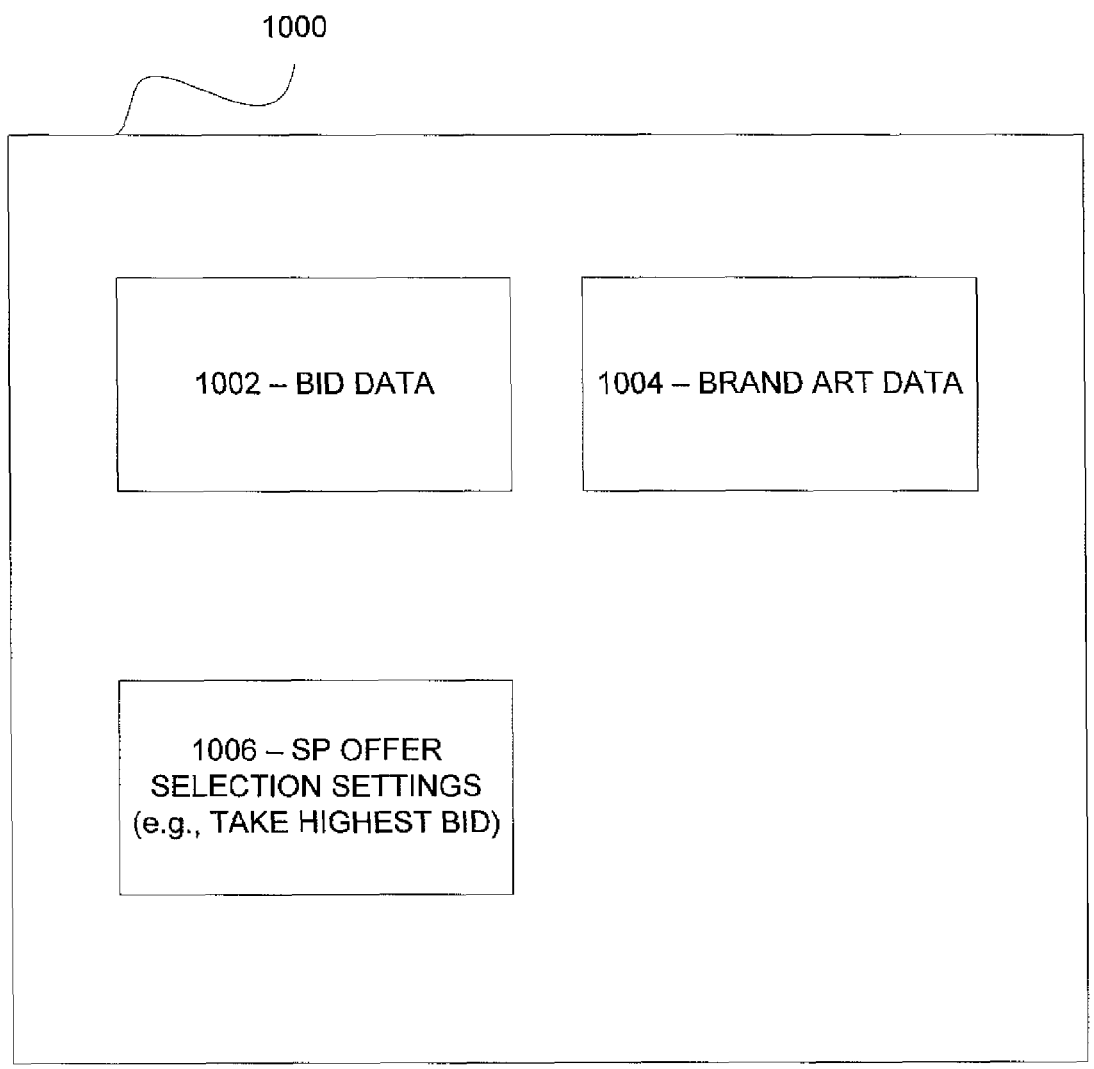
FIG. 10 depicts an example of an offer selection module in accordance with one or more embodiments.

Referring now to FIG. 10, a block diagram of an offer selection module 1000 is provided according to one embodiments of the invention. One of skill in the art will appreciate that in alternative embodiments, the publisher of social content may not have the control to self select sponsorship offers but rather some permutation of the relevant and highest bid offer may be automatically served to the publishers' social content. The offer selection module allows social publishers to view selected sponsorship offers from brand promoters and to determine whether they wish to display the brand within their social content in exchange for some form of compensation, or in other embodiments publishers may be limited to simply choosing which offer they prefer rather than whether or not to select any. In one embodiment, the selected sponsorships offers are limited based on the bid value brand promoters have associated with the sponsorship offer. For example, in one embodiment, only the top five offers will be presented to the social publishers for selection. In addition, the sponsorship offers may be presented without actual monetary compensation values, but rather only include a ranking of the value of the sponsorship offers. In another embodiment, the social publisher may be required to agree to a duration of sponsorship in order to accept a sponsorship offer. The duration may be defined as a calendar date or it may defined as a number of impressions.

As discussed above, the compensation provided to the social publisher may take various forms. In one embodiment, the benefit may simply be an ability to influence the brand content displayed within their social content. In other embodiments, the social publisher may receive some form of brand specific perk or access. For example, the social publisher may receive promotional items from the brand promoter or access to promotional events. In some embodiments, the social publisher may receive monetary compensation. The monetary compensation may take the form of credits to an electronic money account such as PayPal® that is tied to their social publishing account, or some other form of accepted payment. In other embodiments, the compensation may be in the form of bonus points, reward points, or possibly gift certificates that may be used for the purchase of goods and services. Other forms of compensation may also be provided.

The offer selection module 1000 provides a mechanism that allows social publishers 202 to view and/or accept sponsorship offers received from brand promoters. The offer selection module 1000 may receive bid/offer data 1002 generated by the brand campaign management module 600 and association module 900. The offer selection module may be configured to present the available sponsorship offers to social publishers. In addition, the offer selection module 1000 may also display brand art data 1004 to the social publishers so that the social publishers are able to judge which brand art is most acceptable for display within their social content. The offer selection module 1000 may also include data offer selection settings data 1006. In one embodiment, the offer selection settings data 1006 may be a setting that allows a social publisher to automatically accept the highest paying sponsorship offer.

User Interfaces

FIGS. 11 and 12 provide examples of user interfaces that may be used in accordance with various aspects of the invention. Although these examples illustrate specific implementations, one of skill in the art will readily appreciate that various types of user interfaces may be utilized, and that the embodiments described herein are merely illustrative.

Figure 11A:
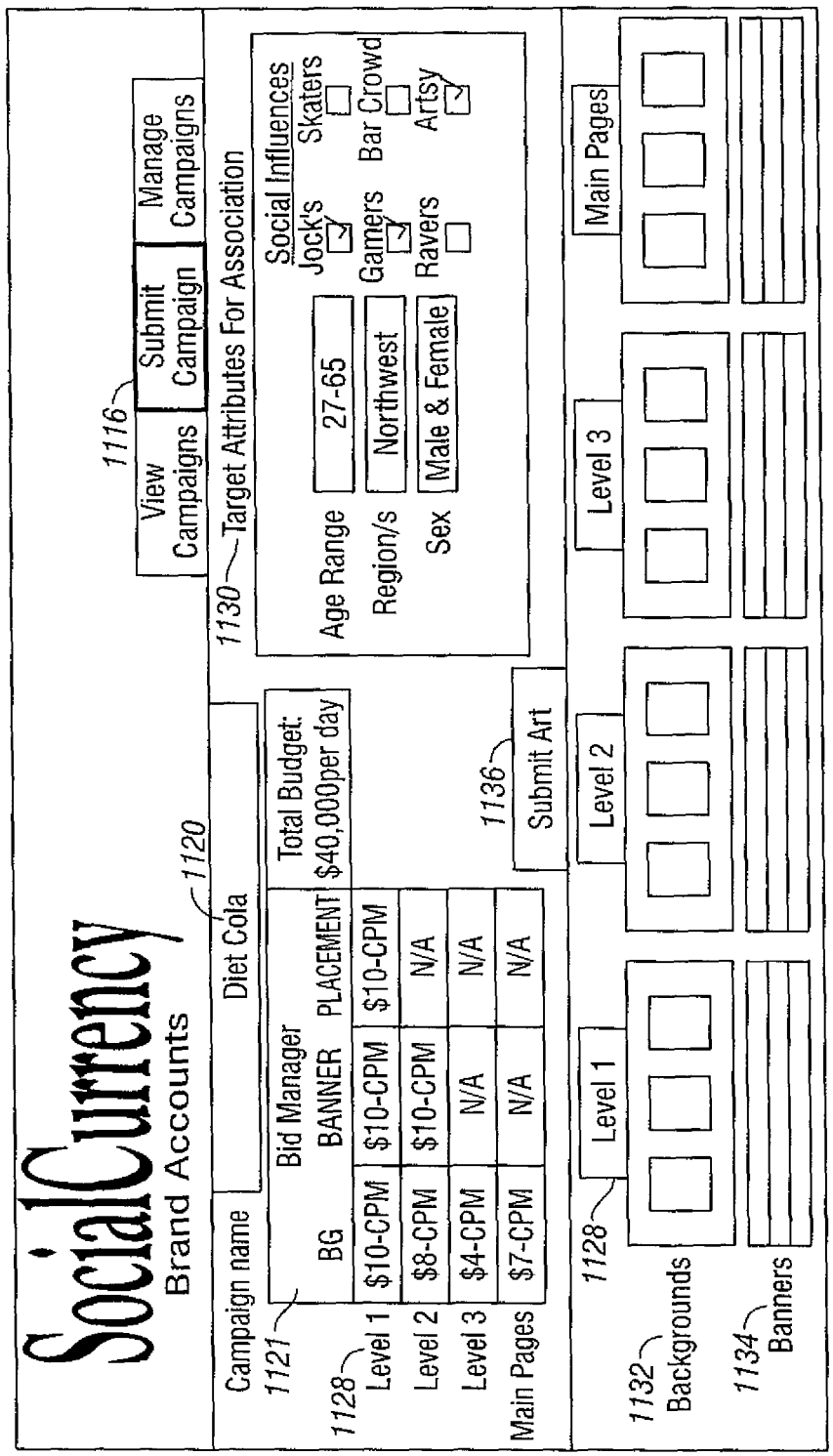
Figure 11C:
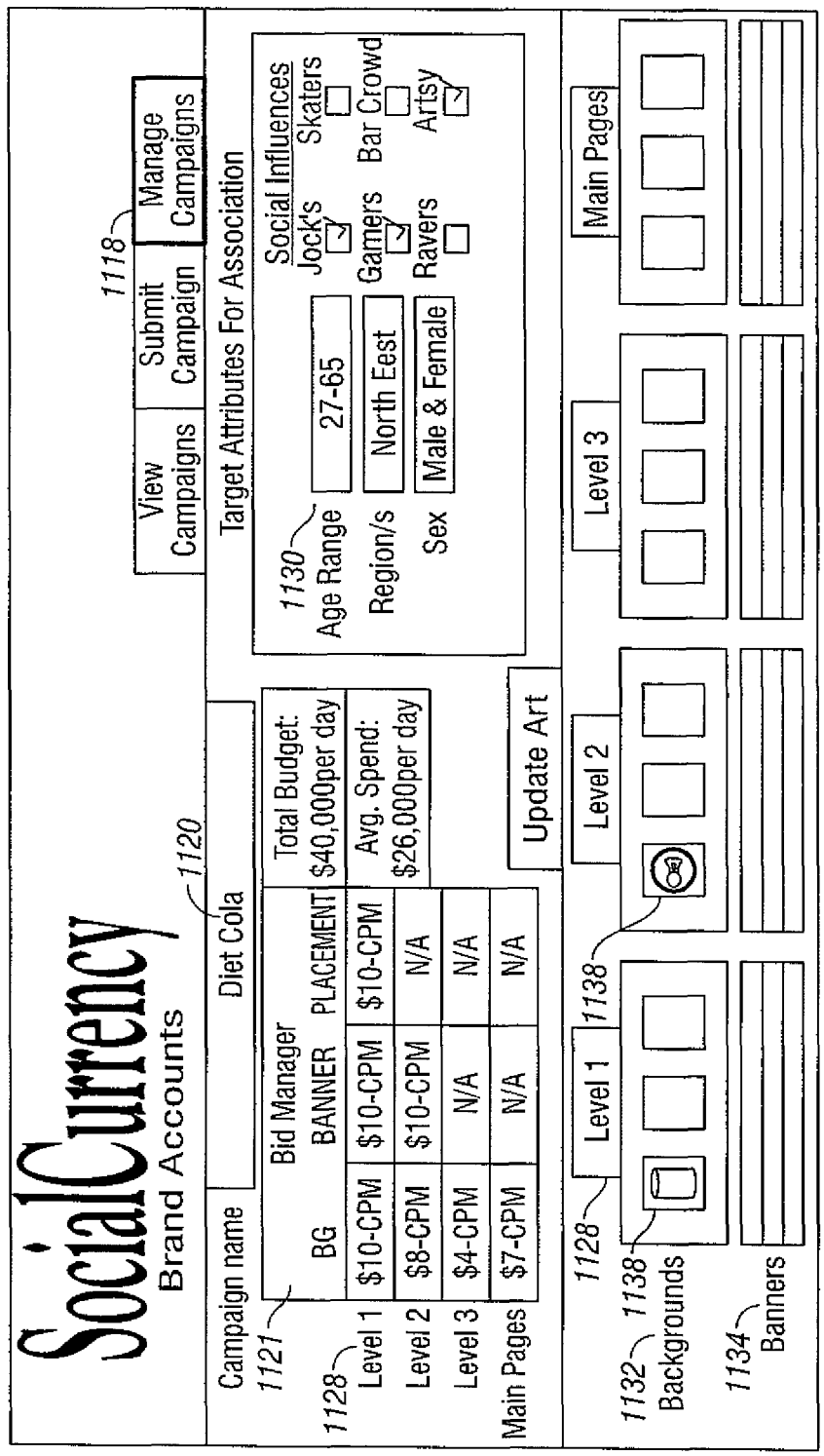

FIGS. 11A-C provide an example of a user interface 1100 that may be used by a brand promoter to view, update, create and manage brand campaigns. The user interface 1100 includes a "View Campaigns" tab 1114, which, when selected will cause the system to display information related to the brand promoter's existing brand campaigns. The user interface 1100 also may include a "Submit Campaign" tab, which, when selected will cause the system to display a form for submitting a new brand promotion campaign. Selecting the "Manage Campaigns" tab 1118 allows the user to update and edit their existing brand campaigns.

FIG. 11A provides an example of a form that may be used by a brand promoter to enter data that may be used by the brand promoter management module 600, or more specifically, the campaign creation/management module 606 to create a new brand campaign within the social network 200. The brand promoter may enter a campaign name 1120, which in the example provided is "Diet Cola." The brand promoter may also enter bid data into a bid manager form 1121. The bid data may include a total budget for the brand campaign. In the example shown, the brand promoter has specified that he wishes to spend up to $40,000 per day on the brand campaign. The bid manager form 1121 also includes a data entry form that is a table including four rows and three columns. Each of the first three rows specifies a bid amount display brand art within the content of various levels of social influence, e.g., Level 1 (high social influence), or Level 3 (low social influence) for the social publishers. Although only three levels are provided in the example, one of skill in the art will appreciate that any number of levels may be defined or utilized. The fourth row "Main Pages" refers to a bid amount for displaying brand art in a community page within the social network. Each of the columns designates how the brand art is displayed within the social content. A bid in the first column, BG (background), means that the brand art will be displayed as a background image on the social publisher's page. A bid in the second column, Banner, provides for a banner advertisement to appear within the social publisher's social content. A bid in the third column, Placement, means that the brand art will be in the form of a product placement somewhere on the website or within the social content of the social publisher. By way of example, a social publisher may upload to his site a picture of himself with the sponsor's product clearly displayed within the picture. One of skill in the art will appreciate that brand art may be displayed in social content in other ways. Additional columns could be added to account for these additional forms of display. In some embodiments, the campaign creation/ management module 606 may be configured to estimate a "burn rate" for the ad campaign based on the social influence levels and bid amounts provided.

Thus, the brand promoter may enter a bid value for each type of ad placement for each level of social influence. In one embodiment the bid value is an amount per CPM (cost per thousand impressions). The bid value can be other type of compensation that are non-monetary in nature. In some embodiments, banner and product placement ads may not be available for each level of social influence. In these instances, the entry fields may include an indication that no bid is available. In some embodiments, the bid amount may be paid to the social network 200. In other embodiments, a portion of the bid amount may be paid to the social network 200, and a portion of the bid amount may be paid to social publishers 202 who accept the sponsorship offers.

In creating a brand campaign, a brand promoter may also specify the target attributes for association with the brand. The user interface 1100 in FIG. 11A may retrieve target attribute data 602 and display the available attributes 1130 for selection by the brand promoter. In one embodiment, the available attributes 1130 may include both demographic and psychographic attributes. In the example provided, the brand promoter may specify demographic attributes in the forms of an age range, a geographic region, and/or the sex of the social publisher. In the embodiment shown in FIG. 11A, input form also provides for the selection of social attributes by selecting the appropriate checkbox. In the example provided, the brand promoter has selected "Jocks" as the desired social attribute. Although FIG. 11A provides an example in which social publisher attributes have been grouped into categories, in other embodiments, the brand promoter may be permitted to define a target persona based on any attribute data collected by the persona definition module 700.

Next, the brand promoter may submit the brand art data 1004 that will be served with the social content of those social publishers 202 whom accept sponsorship offers from the brand. In one embodiment, the brand art data may be a graphics image such as a GIF or JPEG file. In other embodiments, the brand art data 1004 may be some other form of multimedia file such as a sound file or a movie file. The brand art data 1004 may also be simply text. Once the brand promoter has specified the target attributes, provided bid amounts of the various types of ads and the various social influence levels, and submitted the appropriate brand art, the brand promoter may submit the form. The data in the form may be submitted to the campaign creation/management module 606, which will process the data and enter it into a database of brand campaigns.

After the brand campaign has been created, the brand promoter may select the "View Campaigns" tab 1114 to access information about all of the existing brand campaigns. FIG. 11B provides an example of a user interface which allows a brand promoter to view data about existing brand campaigns. The display may include a table 1128 similar to the bid manager form 1121 from FIG. 11A. The displayed information may include a column of existing campaigns 1120. In the example provided, each of the listed campaigns may be a hyperlink that when activated by the user causes the information about that particular campaign to be displayed in the table 1128. The data included in the table 1128 may include measurements of the status of currently ongoing brand campaigns. In the example provided in FIG. 11B, the information provided includes the current bid amount, the number of page views for the day, and the amount spend on the campaign for the day. The Cola College campaign has been selected, so the data displayed in the table relates to that particular campaign. Clicking on any of the other campaigns 1120 listed causes the system to display the data about that specific campaign. The View Campaigns interface also may be configured to allow the brand promoter to view the activity in existing campaigns by broken down by geographical locations by selecting the link to Geography 1129.

Brand promoter may also make changes to existing brand campaigns by providing data to the campaign creation/management module 606. FIG. 11C provides an example of a user interface that may be used by brand promoters to update their existing brand campaigns. In one embodiment, this view/interface may be accessed by selecting the Manage Campaigns tab 1118. The Manage Campaigns interface may look similar to the Submit Campaign interface. However, instead of each of the form fields being initially blank as with the submission module, the campaign management interface pre-populates the fields with the existing values for the selected brand campaign. In addition, the bid manager field may also provide additional information such as, for example, the average per diem total expenditures for the brand campaign. In the example shown in FIG. 11C, the brand art 1138 that is associated with the brand campaign 1120 may be replaced or updated by clicking on the "Update Art" button and uploading new brand art. In banner art 1134 may also be added through the Management Interface 1118. The bid manager table also may allow for the bid amounts to be adjusted, and the target attributes 1130 may also be changed so that the brand art sponsorship offers may be presented to different social publishers 202.

As discussed above, aspects of the invention provide for social publishers 202 to provide information regarding their personality and preferences, and based on those preferences and other factors such as social and geographical location, receive sponsorship offers from brand promoters to display brand art in exchange for some form of benefit. FIGS. 12A-C provide an example of a social publisher interface 1200 that allows a social publisher to enter data or information that will be submitted to the online persona definition module 700 and to create an account for receiving sponsorship offers from brand promoters. The social publisher interface 1200 may include identity data entry fields 1202 into which the social publisher may enter identifying data 704. The interface 1200 may also include social network affiliation data entry fields 1206. In the exemplary interface 1200 provided, the right side of the screen includes persona data entry fields 1204 which request information from the social publisher 202 related to their personal preferences. This data may be used to derive an online persona for the social publisher 202 as described above in connection with FIG. 7. In some embodiments, the persona data entry fields may include several questions requiring that the social publisher enter information and then proceed to a new screen which asks additional questions. For example, the persona defining questions in FIG. 12B relate to how the social publisher spends time in an average week, while the questions in FIG. 12C relate to how social publishers would like to spend leisure time. In some embodiments, the social publisher may answer questions in the persona data entry area 1204 and click on a form submit button 1208 which may submit the data to the online persona definition module, the then serve new questions in the next screen. As discussed above, the content of the questions may take various forms. In some embodiments, the questions may be of the type used to create a Myers-Briggs like personality profile. In other embodiments, the questions may relate to tastes in consumer products or professional interests. In sum, any type of data about the social publisher may be requested for input into the online persona definition module 700, so long as it provides insight into the personality of the social publisher 202.

Once the social publisher has created his account, he may be eligible to receive and manage sponsorship offers from brand promoters. FIGS. 12D-F provide an example of a social publisher account management interface that may be used by a social publisher to manage his account.

With reference to FIG. 12D, the interface may include an earnings view 1220 with displays the current sponsorship 1222 of the social publisher. The earnings view 1220 may also include an earnings table 1224 which displays the amount of money (or other non-monetary compensation as described above) owed the social publisher resulting from his display of the sponsoring brand promoter's brand art within his social content. The earnings view may also include a referral link which allows the social promoter to invite friends to join the system. Because in some embodiments the social publisher 202 may be permitted to terminate his sponsorship at a particular time, the system may provide an interface by which the social publisher 202 may review new sponsorship offers and compare them to existing sponsorship offers to determine which to select. FIG. 12E provides an example of a sponsorship offer view 1234 which may be used by social publishers 202 to determine which sponsorship offers to accept. The user interface includes a table 1230 of outstanding sponsorship offers. In one embodiment, the social publisher may configure his account to automatically accept the highest paying sponsorship offer. In the example provided, this functionality may be activated by selecting the "ON" button from the set of buttons 1232.

In another embodiment, the social network 200 provides the social publisher 202 with the ability to communicate important information to the social network. FIG. 12F is an example of a "Contact Us" web page that allows the social publisher 202 to communicate with the social network 200. One aspect of the contact page is the ability for a social publisher to report that his sponsorship offers do not accurately reflect his personality. By clicking on the sponsorship offers link 1240, the social publisher may be presented with a form in which he may describe how the sponsorship offers are inadequate. This type of feedback information may alert the social network 200 of a need to adjust its online persona definition module 700.

The "Contact Us" page may also include a "Report a Violator" link 1242. This link allows the social publisher to alert the social network 200 to a violation of the TOS by another social publisher. In one embodiment, a social publisher who reports another social publisher in violation of the TOS may receive a reward or benefit if the report is ultimately verified. For example, a social publisher may receive a increased value in his social influence level. This allows the social network to take prompt action against the violator to prevent the violator from posting content that is damaging to a brand image within the social network. The "Contact Us" page may also include links to provide general feedback to the social network 1244 and to invite others to join the network 1246.

In some embodiments, the above-described systems and modules may be used to perform a computer-implemented method of associating a brand with social publishers. FIG. 13A is a flowchart describing an exemplary method. At block 1300, the system receives a set of desired attributes. Those attributes are then compared to attributes of a social publisher at block 1302. Next, at block 1304, if the desired attributes align with the attributes of the social publisher, the social publisher is selected and the process continues to block 1306. If there is no alignment the process returns to block 1302, and the attributes are compared to the next social publisher. Once the system has selected the social publisher, at block 1308 a notification is sent to the social publisher indicating that a sponsorship opportunity is available.

In another embodiment, the above-described systems may be used to associate social publishers to appropriate brand promoters. FIG. 13B is a flowchart describing an illustrative method. At block 1310, the system may receive the attributes or attributes of a social publisher 202. The social attributes are the compared against the next active brand campaign at block 1312. Next at block 1314, if the brand campaign is not seeking the social attributes of the social publisher 202, the method returns to block 1312, where it proceeds to compare the social attributes to the next active brand campaign. If the brand campaign is seeking the social attributes of the social publisher, the method proceeds to block 1316, where the brand campaign is selected for association with the social publisher. Finally, at block 1318, after the brand campaign is selected for association, a notification may then be sent to the social publisher alerting them to a sponsorship opportunity.

Figure 14:
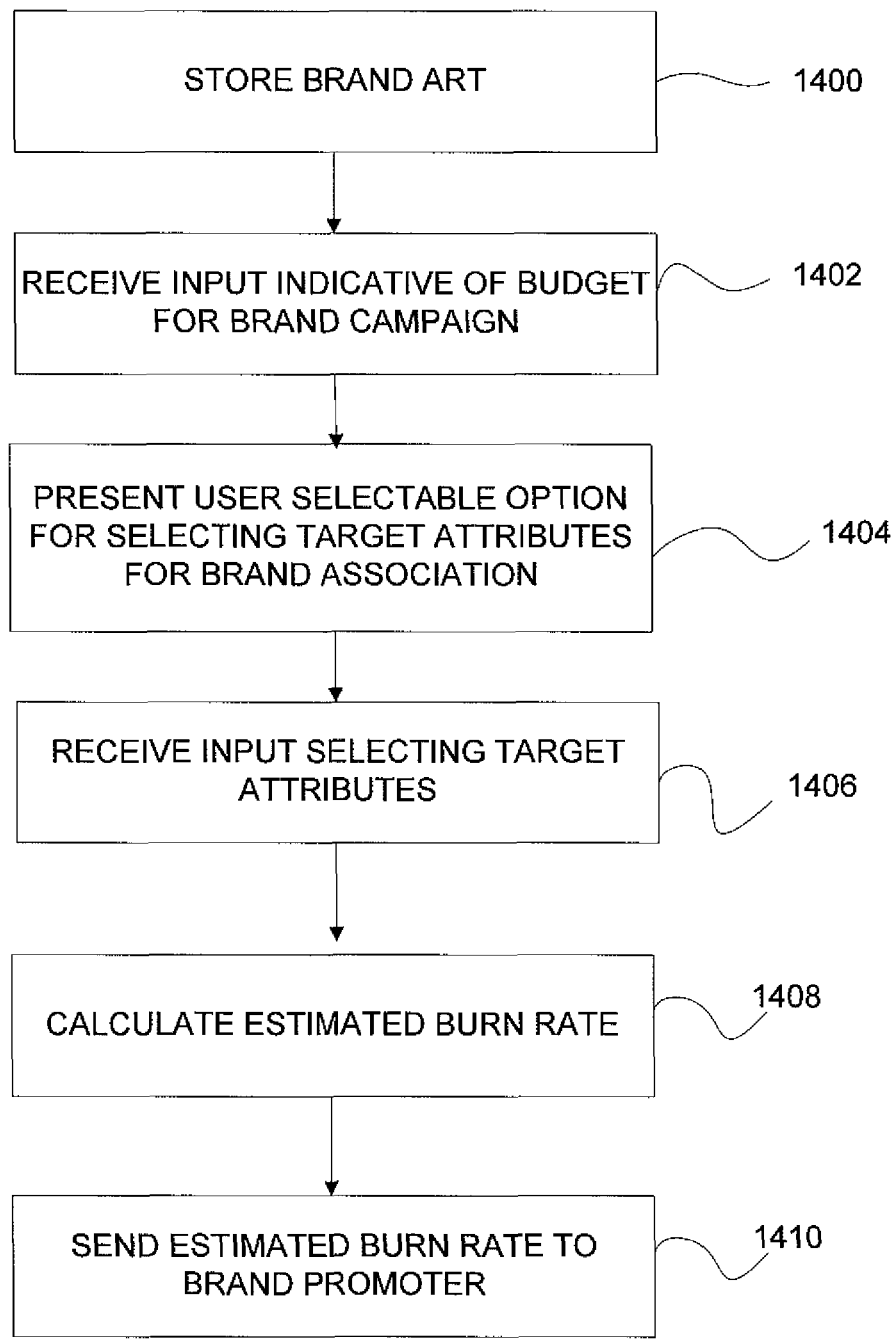
FIG. 14 depicts a method of building an online brand campaign in accordance with one or more embodiments.

In yet another embodiment, the system disclosed herein may be used to perform a method of building an online brand campaign. FIG. 14 is a flowchart of the steps that may be performed in accordance with this embodiment. At block 1400, brand art suitable for displaying in network environment is stored in a memory. The brand art may be submitted by a brand promoter using an interface such as that described in FIG. 11 to submit data to the campaign creation module 606. Next, at block 1402, the system receives an input indicative of budget for the brand campaign. The system may present a user selectable option which allows the brand promoter to select target attributes for brand association. The user selectable option may be presented as a list of items with selectable checkbox elements 1130 as shown in FIG. 11A. Proceeding to block 1408, the system then calculates the estimate rate of budget depletion and estimated reach of the brand campaign based on the target attributes and budget data. Finally, at block 1410, the calculated estimated burn rate is displayed to the brand promoter.

What is claimed is:

1. A computer-implemented method for building a brand campaign in a social networking system, the method comprising:
    receiving, by a computer system from a brand promoter, a budget and brand art for a brand campaign in a social networking system;
    receiving, by the computer system, one or more target attributes of social publishers in the social networking system, the target attributes selected by the brand promoter to sponsor as part of the brand campaign;
    prior to activating the brand campaign, estimating, by the computer system and transmitting to a device of the brand promoter, a campaign fulfillment metric comprising a reach and burn rate indicating an expected number of impressions to other members in the social networking system of the brand art based at least in part on the target attributes and the budget, wherein the estimated campaign fulfillment metric is estimated based, at least in part, on a social influence level of social publishers having the target attributes and who are estimated to accept an offer to receive compensation for allowing the brand art to be automatically included within social content of the social publishers having the target attributes;
    responsive to activating the brand campaign, identifying, by the computer system, a social publisher having the target attributes selected by the brand promoter, the identified social publisher being a member of the social networking system;
    communicating, by the computer system to a device of the identified social publisher, the offer for the identified social publisher to receive compensation in exchange for the identified social publisher allowing the brand art to be automatically included within social content of the identified social publisher, the social content published by the social networking system; and
    responsive to receiving from the device of the identified social publisher an acceptance of the offer, causing the brand art to be automatically included within the social content of the identified social publisher displayed to other members in the social networking system.

2. The computer-implemented method of claim 1, wherein the budget includes a bid amount for each page served with the brand art.

3. The computer-implemented method of claim 1, further comprising:
    modifying the estimated campaign fulfillment metric responsive to a change in the budget.

4. The computer-implemented method of claim 1, wherein the campaign fulfillment metric is estimated based, at least in part, on a number of social publishers suitable for displaying the brand art and an estimate of acceptance of offers by the social publishers.

5. The computer-implemented method of claim 4, wherein the estimate of acceptance of offers by the social publishers is estimated based, at least in part, on a competitiveness of a bid amount.

6. The computer-implemented method of claim 1, further comprising:
    sending an indication of an expiration of time or exhaustion of budget for the brand campaign; and
    receiving an advertiser modification of the budget or expiration date of the brand campaign, in response to sending of the indication of the expiration of time or exhaustion of budget.

7. The computer-implemented method of claim 1, wherein the target attributes received include a minimum social influence measurement of a social publisher suitable for displaying the brand art.

8. The computer-implemented method of claim 1, wherein the compensation is non-monetary compensation.

9. The method of claim 1 wherein the social publishers are bloggers and the social content are blogs authored by the social publishers.

10. The method of claim 1, wherein the social content is user generated content published on personal webpages of the social publishers 11. The method of claim 1, wherein the target attributes include one or more demographics of social publishers.

12. The method of claim 1, wherein the target attributes include a social influence estimate of social publishers.

13. A non-transitory computer readable storage medium storing instructions configured to be executed by a processor, the instructions when executed cause the building of a brand campaign in a social networking system by a series of steps, the steps comprising:
    receiving from a brand promoter a budget and brand art for a brand campaign in a social networking system;
    receiving one or more target attributes of social publishers in the social networking system, the target attributes selected by the brand promoter to sponsor as part of the brand campaign;
    prior to activating the brand campaign, estimating and transmitting to a device of the brand promoter, a campaign fulfillment metric comprising a reach and burn rate indicating an expected number of impressions to other users in the social networking system of the brand art based at least in part on the target attributes and the budget, wherein the estimated campaign fulfillment metric is estimated based, at least in part, on a social influence level of social publishers having the target attributes and who are estimated to accept an offer to receive compensation for allowing the brand art to be automatically included within social content of the social publishers having the target attributes;

responsive to activating the brand campaign, identifying by the computer system, a social publisher having the target attributes selected by the brand promoter, the identified social publisher being a member of the social networking system;

communicating by the computer system to a device of the identified social publisher, an offer for the identified social publisher to receive compensation in exchange for the identified social publisher allowing the brand art to be automatically included within social content of the identified social publisher, the social content published by the social networking system; and responsive to receiving from the device of the identified social publisher an acceptance of the offer, causing the brand art to be automatically included within the social content of the identified social publisher displayed to other members in the social networking system.

14. The computer readable storage medium of claim 13 wherein the budget includes a bid amount for each page served with the brand art.

15. The computer readable storage medium of 13, the steps further comprising:
modifying the estimated campaign fulfillment metric responsive to a change in the Budget.

16. The computer readable storage medium of claim 13, wherein the campaign fulfillment metric is estimated, at least in part, based on a number of social publishers suitable for displaying the brand art and an estimate of acceptance of offers by the social publishers.

17. The computer readable storage medium of claim 16, wherein the estimate of acceptance of offers by the social publishers is estimated based, at least in part, on a competitiveness of a bid amount.

18. The computer readable storage medium of claim 13, wherein the steps further comprise:
sending an indication of an expiration of time or exhaustion of budget for the brand campaign; and
receiving an advertiser modification of the budget or expiration date of the brand campaign, in response to sending of the indication of the expiration of time or exhaustion of budget.

19. The computer readable storage medium of claim 13, wherein the target attributes received include a minimum social influence measurement of a social publisher suitable for displaying the brand art.

20. The computer readable storage medium of claim 13, wherein the compensation is non-monetary compensation.

21. The computer readable storage medium of claim 13, wherein the social publishers are bloggers and the social content are blogs authored by the social publishers.

22. The computer readable storage medium of claim 13, wherein the social content is user generated content published on personal webpages of the social publishers.

23. The computer readable storage medium of claim 13, wherein the target attributes include one or more demographics of social publishers.

24. The computer readable storage medium of claim 13, wherein the target attributes include a social influence estimate of social publishers.

* * * * *